Dec. 20, 1955
R. B. BILANE ET AL
2,727,699
AUTOMATIC STRAND WINDING MACHINE
Filed May 17, 1952
19 Sheets-Sheet 2
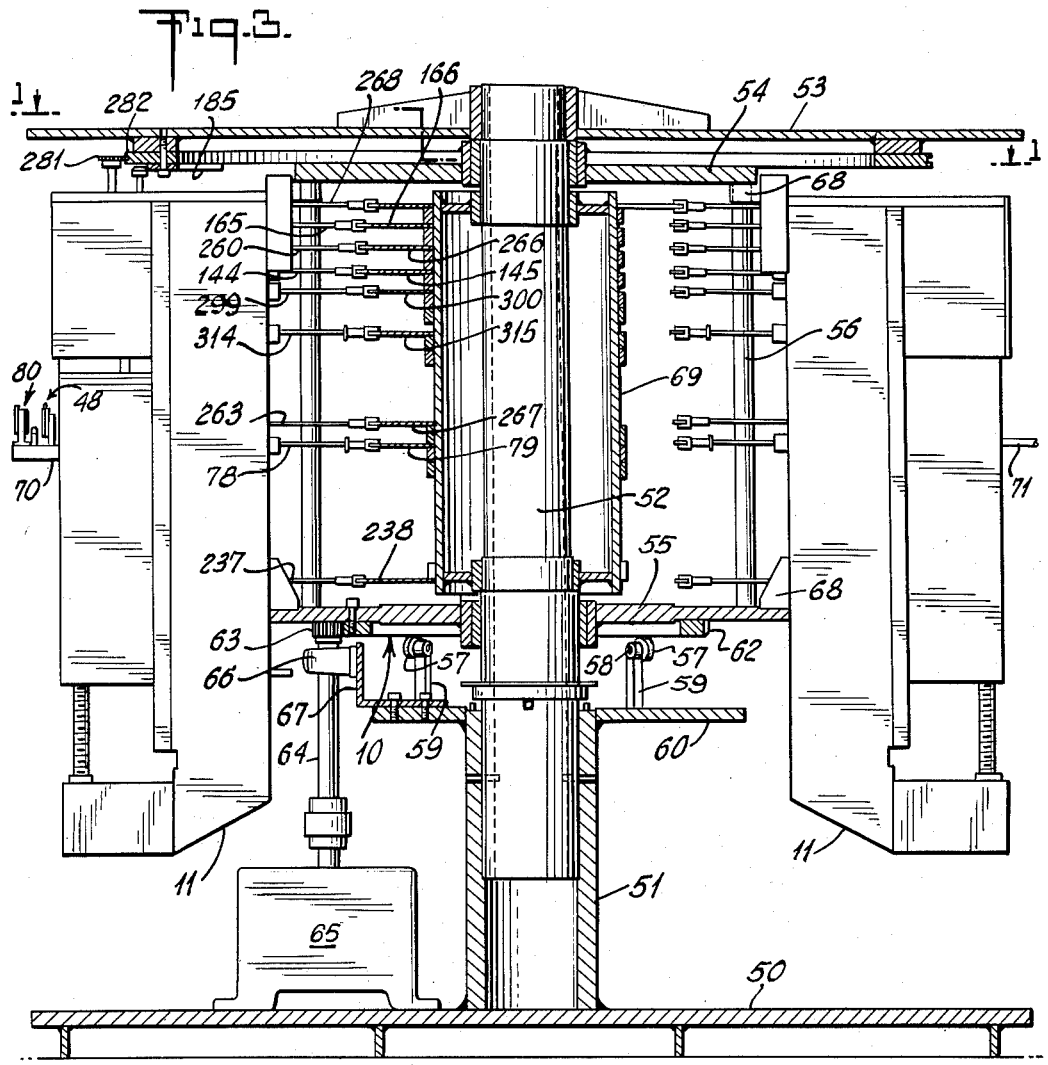
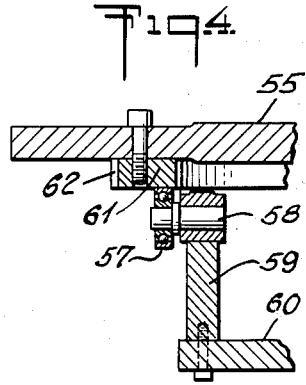
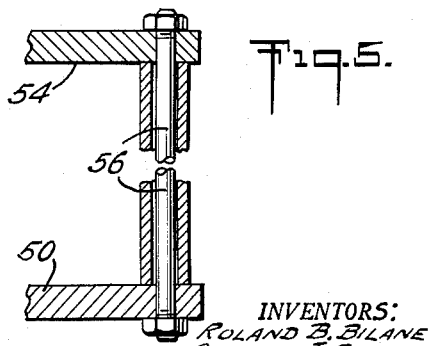
INVENTORS:
ROLAND B. BILANE
GERALD J. BARRY
ROBERT J. SCHAEFER
BY
ATTORNEY

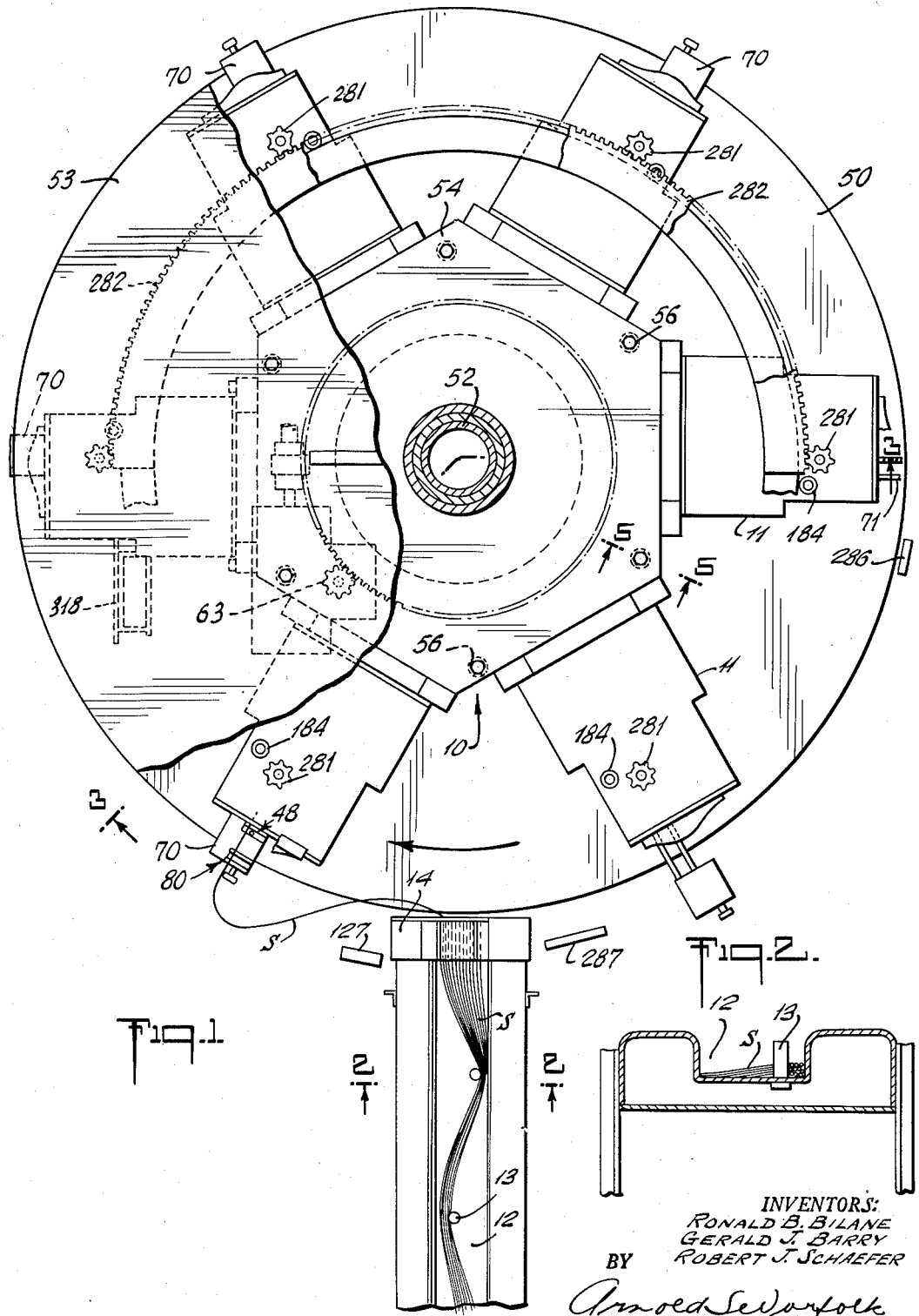

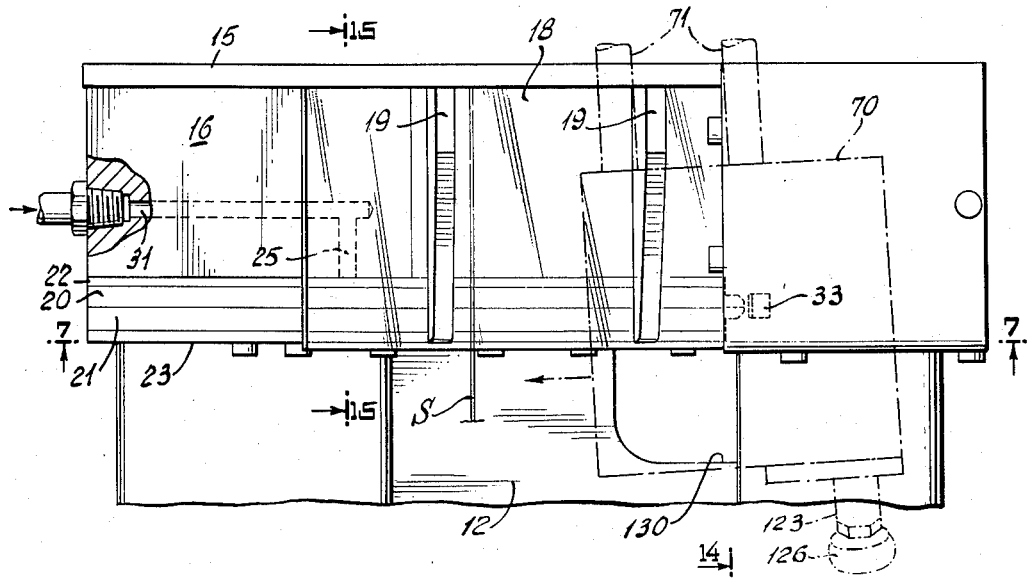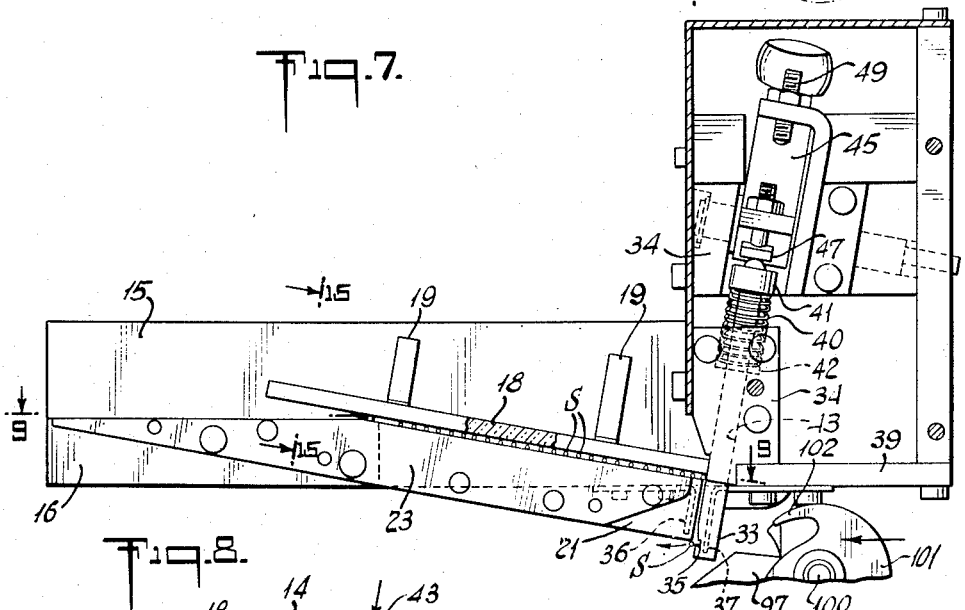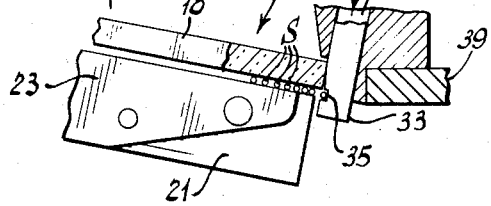

Dec. 20, 1955　　　R. B. BILANE ET AL　　　2,727,699
AUTOMATIC STRAND WINDING MACHINE
Filed May 17, 1952　　　19 Sheets-Sheet 4
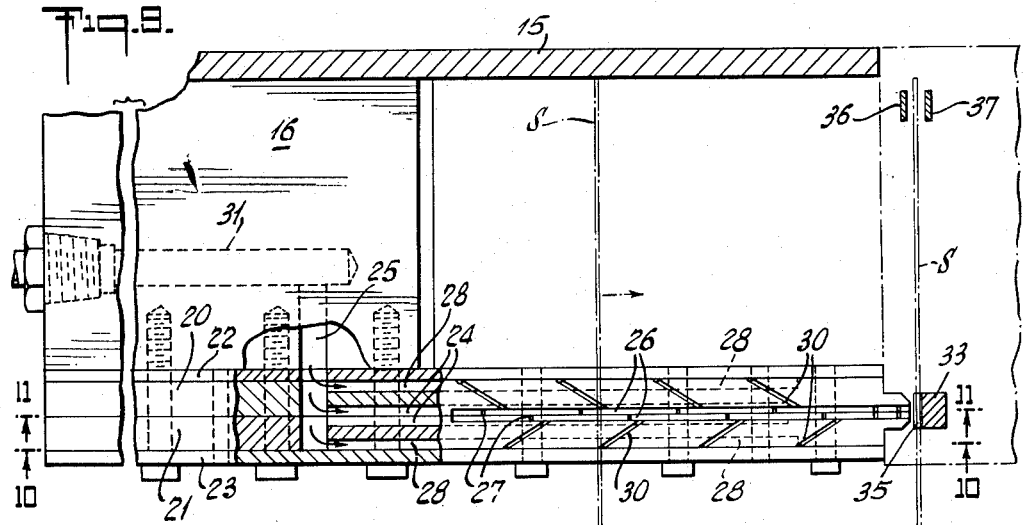
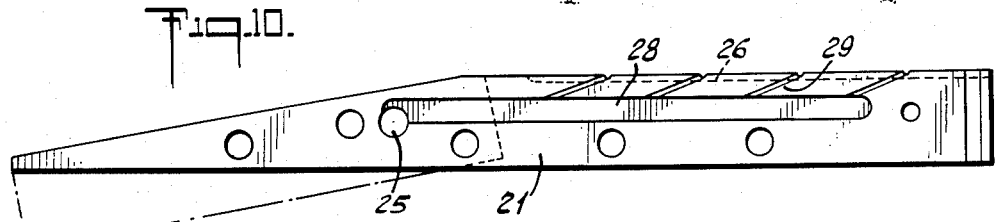
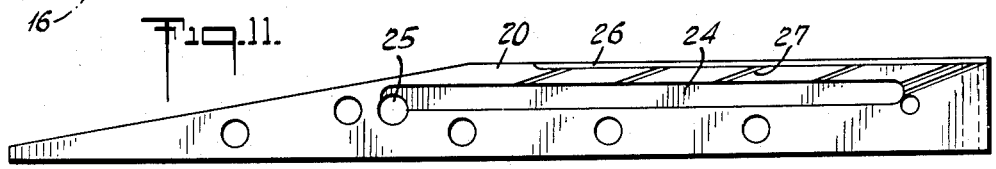
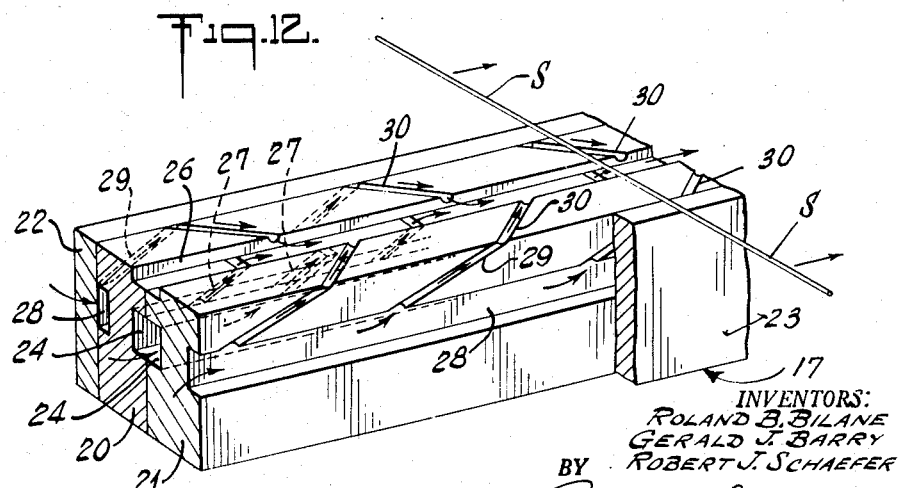
INVENTORS:
ROLAND B. BILANE
GERALD J. BARRY
ROBERT J. SCHAEFER
BY Arnold S. Worfolk
ATTORNEY

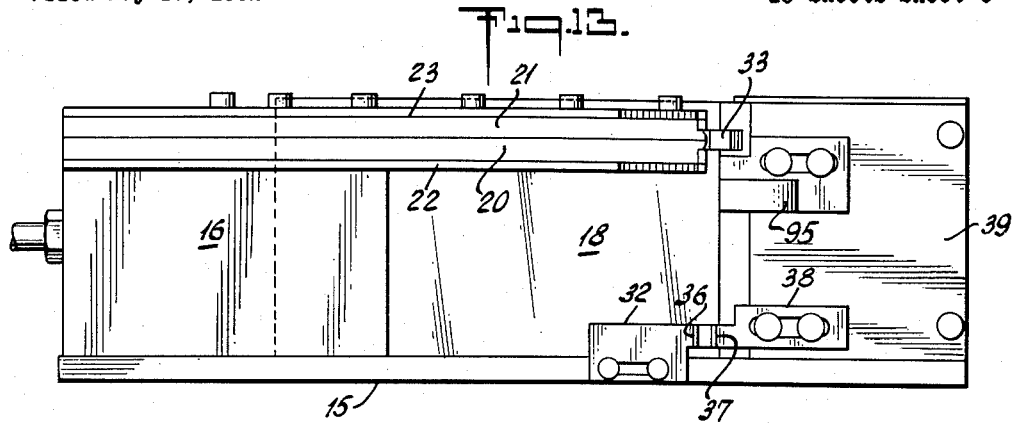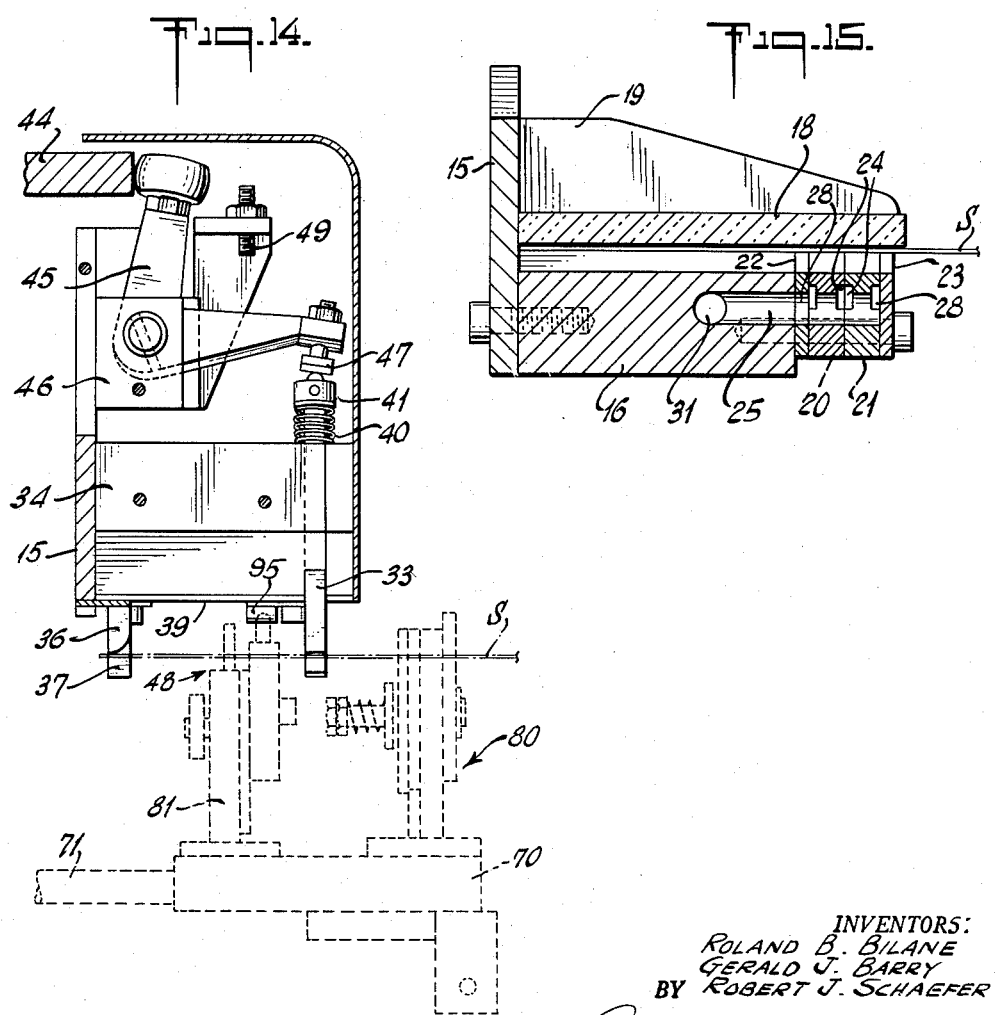

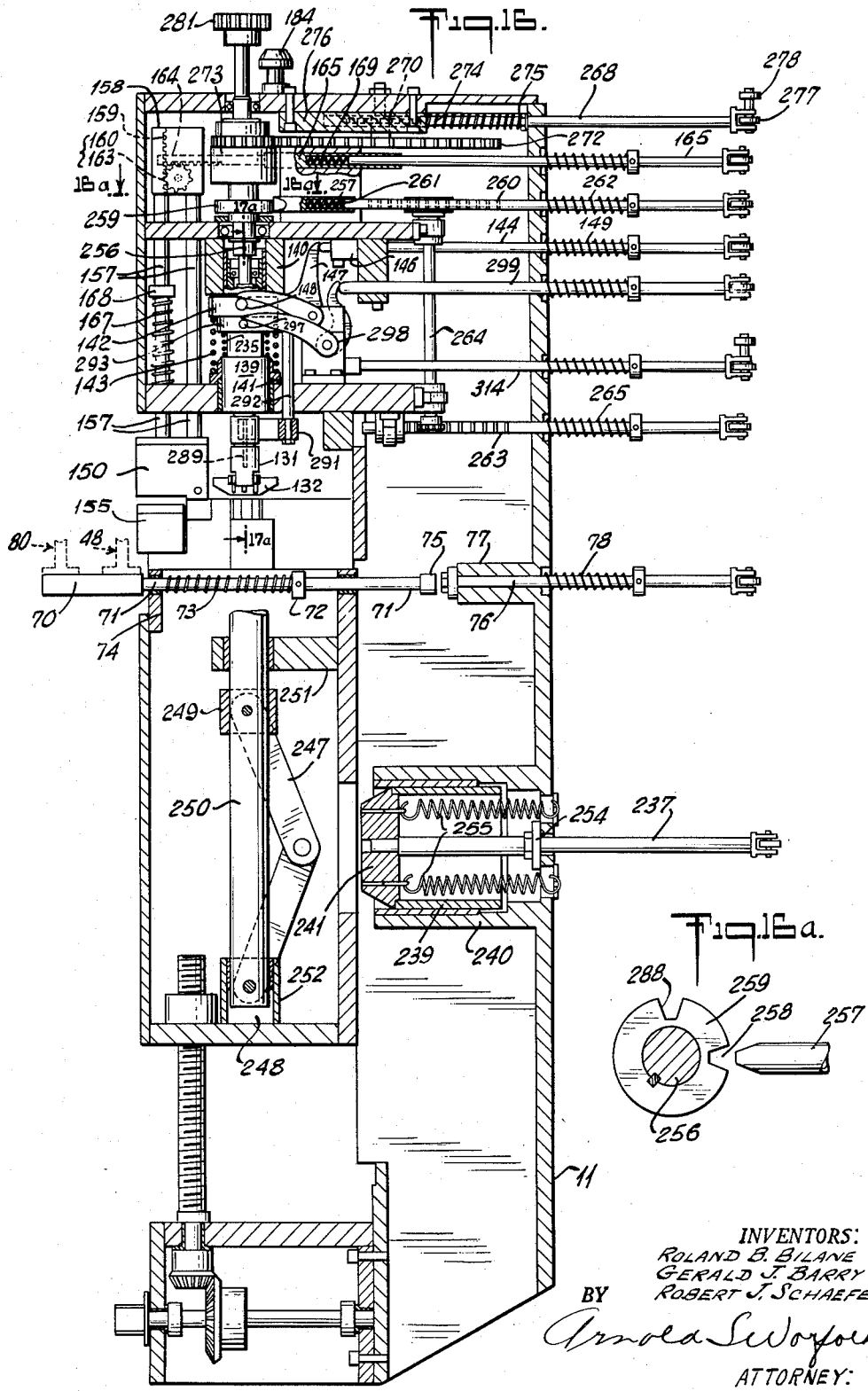

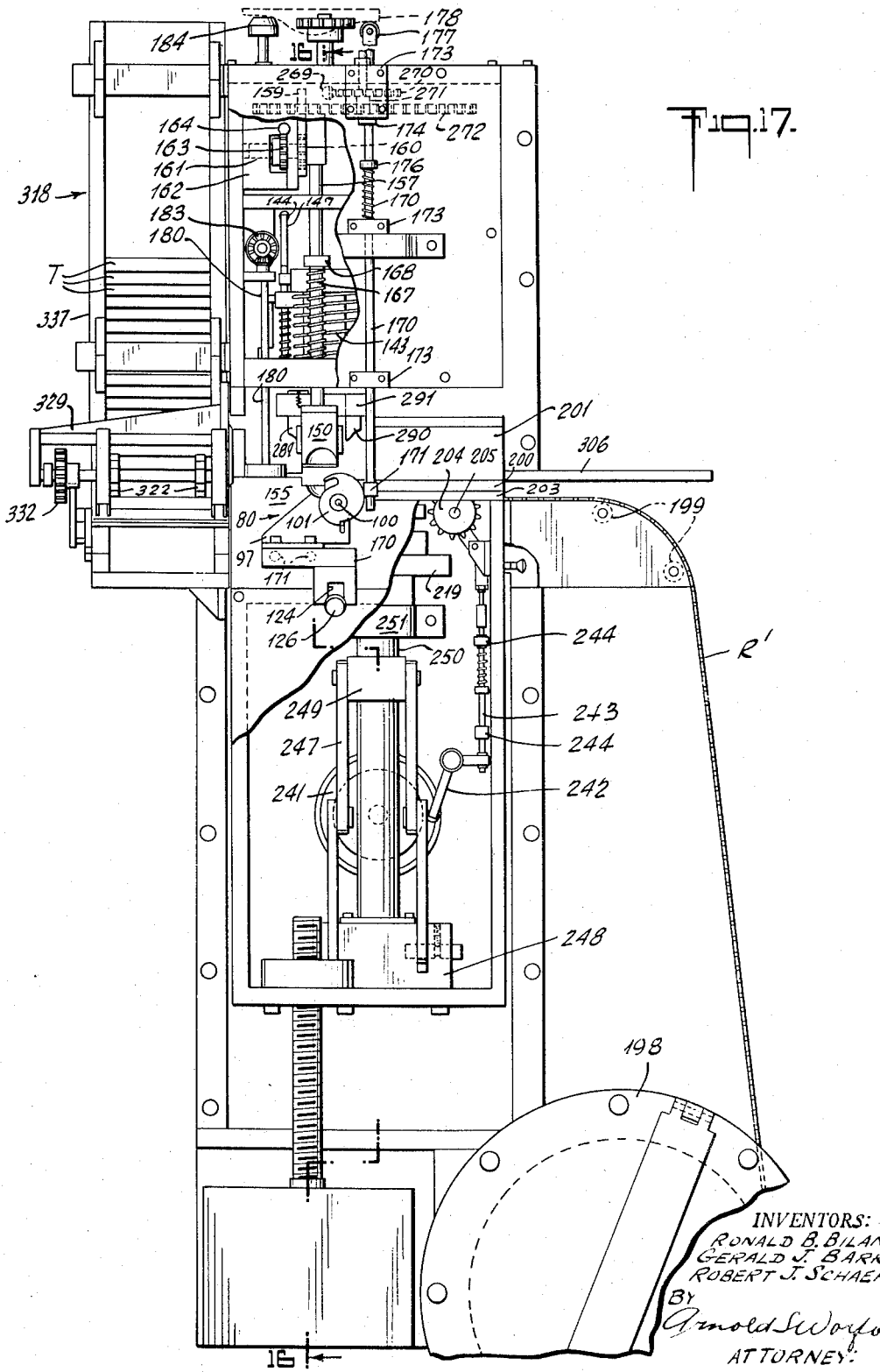

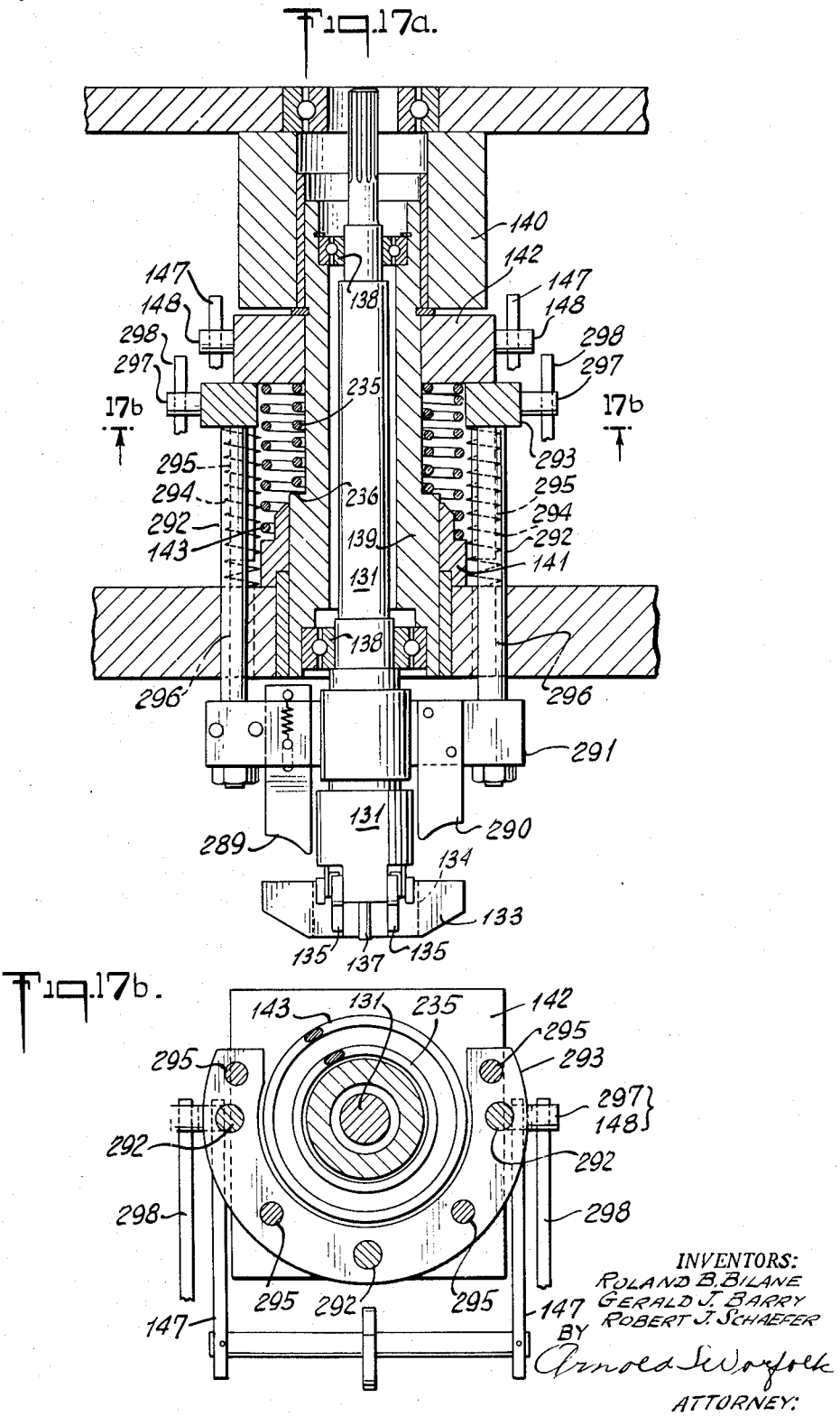

Dec. 20, 1955    R. B. BILANE ET AL    2,727,699
AUTOMATIC STRAND WINDING MACHINE
Filed May 17, 1952    19 Sheets-Sheet 9
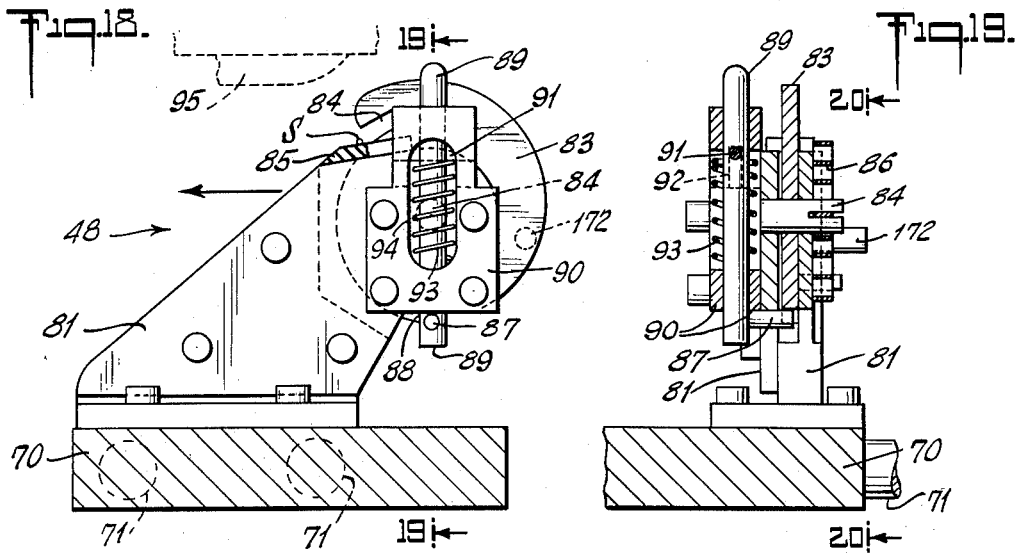
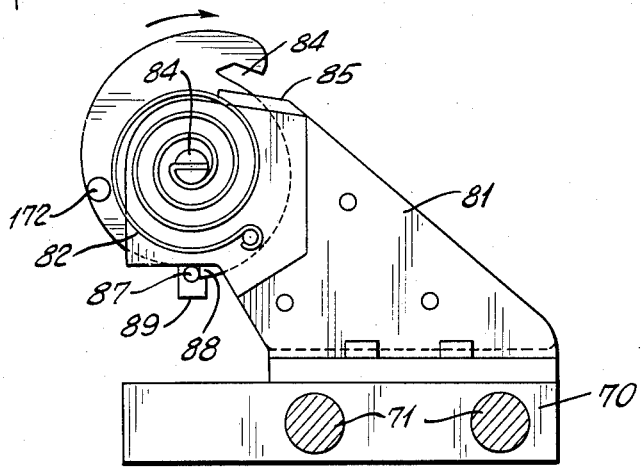
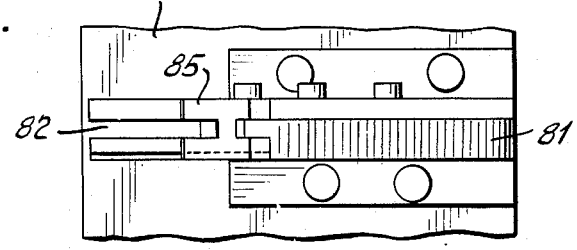
INVENTORS:
RONALD B. BILANE
GERALD J. BARRY
ROBERT J. SCHAEFER
BY Arnold S. Worfolk
ATTORNEY:

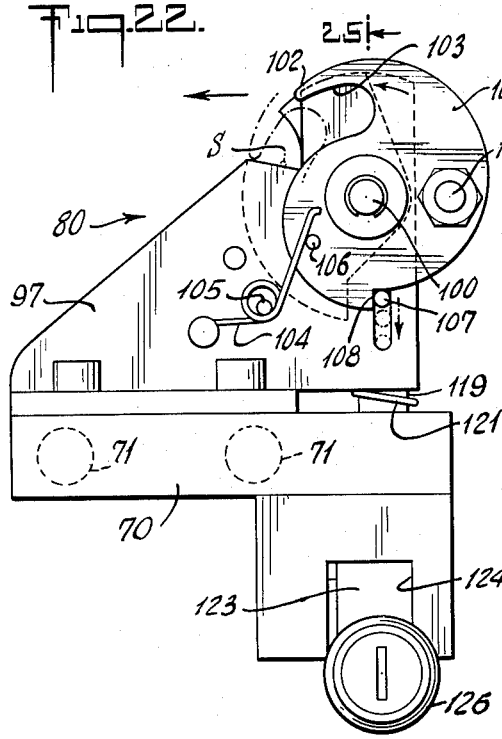
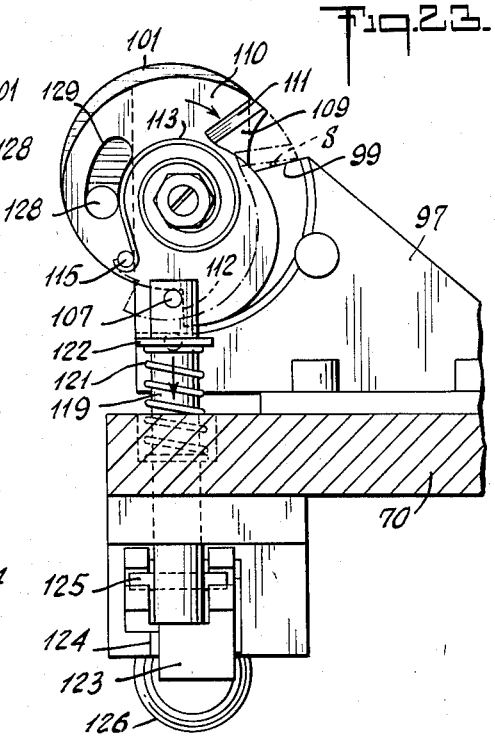
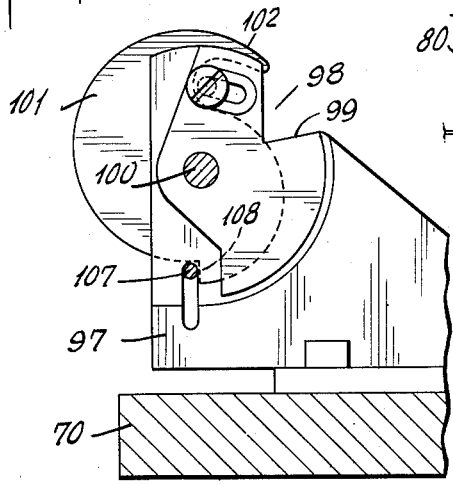
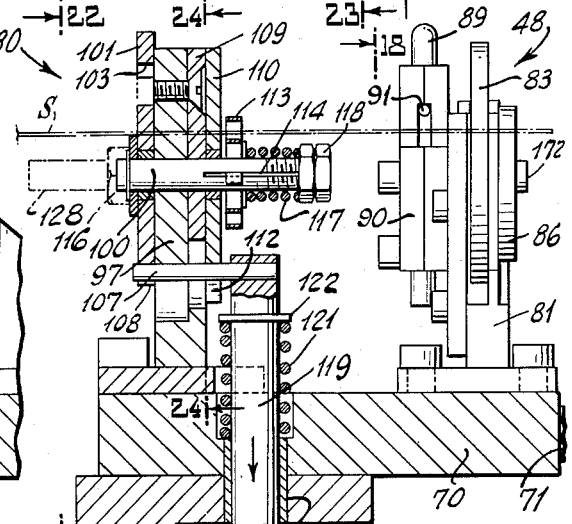

Dec. 20, 1955 R. B. BILANE ET AL 2,727,699
AUTOMATIC STRAND WINDING MACHINE
Filed May 17, 1952 19 Sheets-Sheet 11
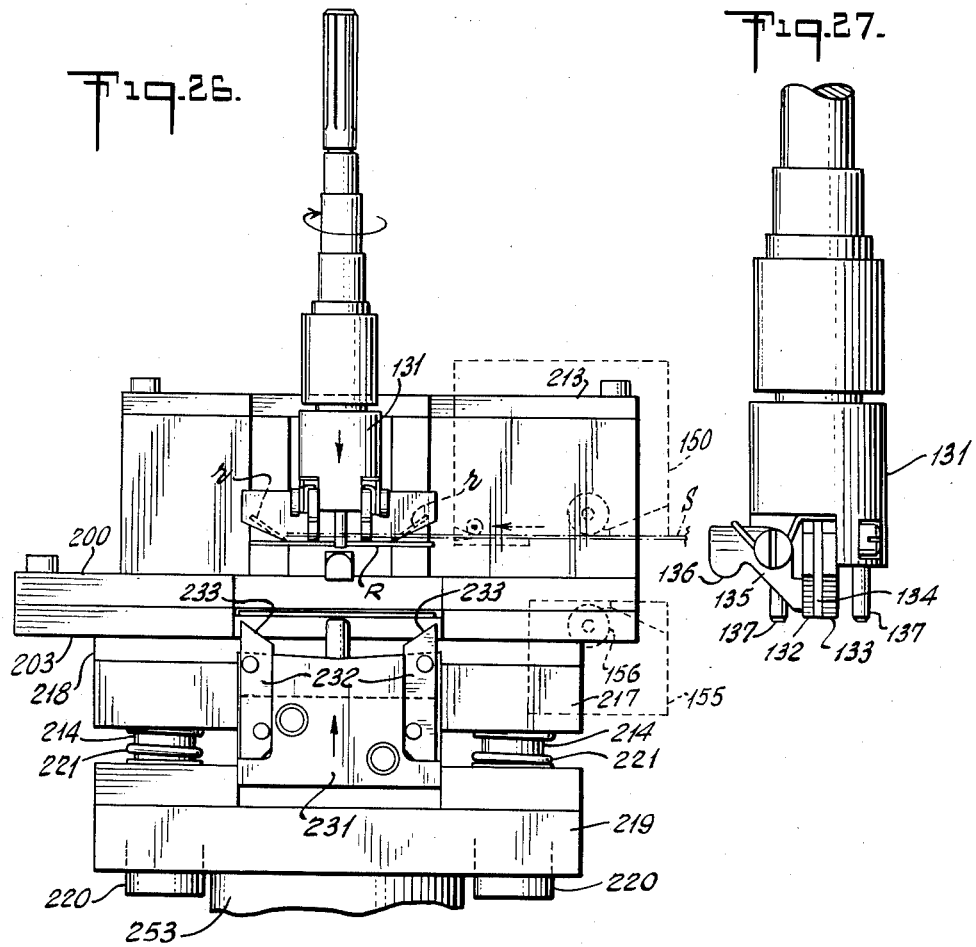
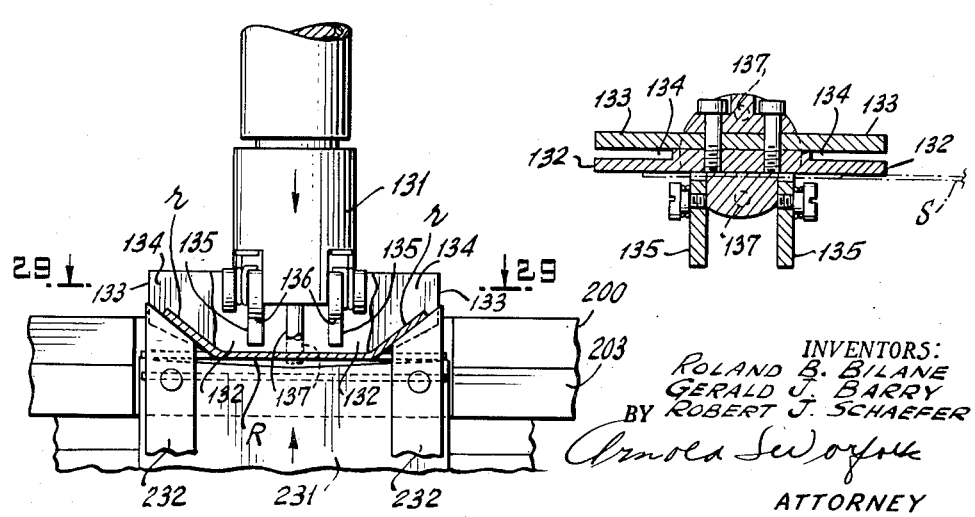
INVENTORS:
ROLAND B. BILANE
GERALD J. BARRY
BY ROBERT J. SCHAEFER
ATTORNEY

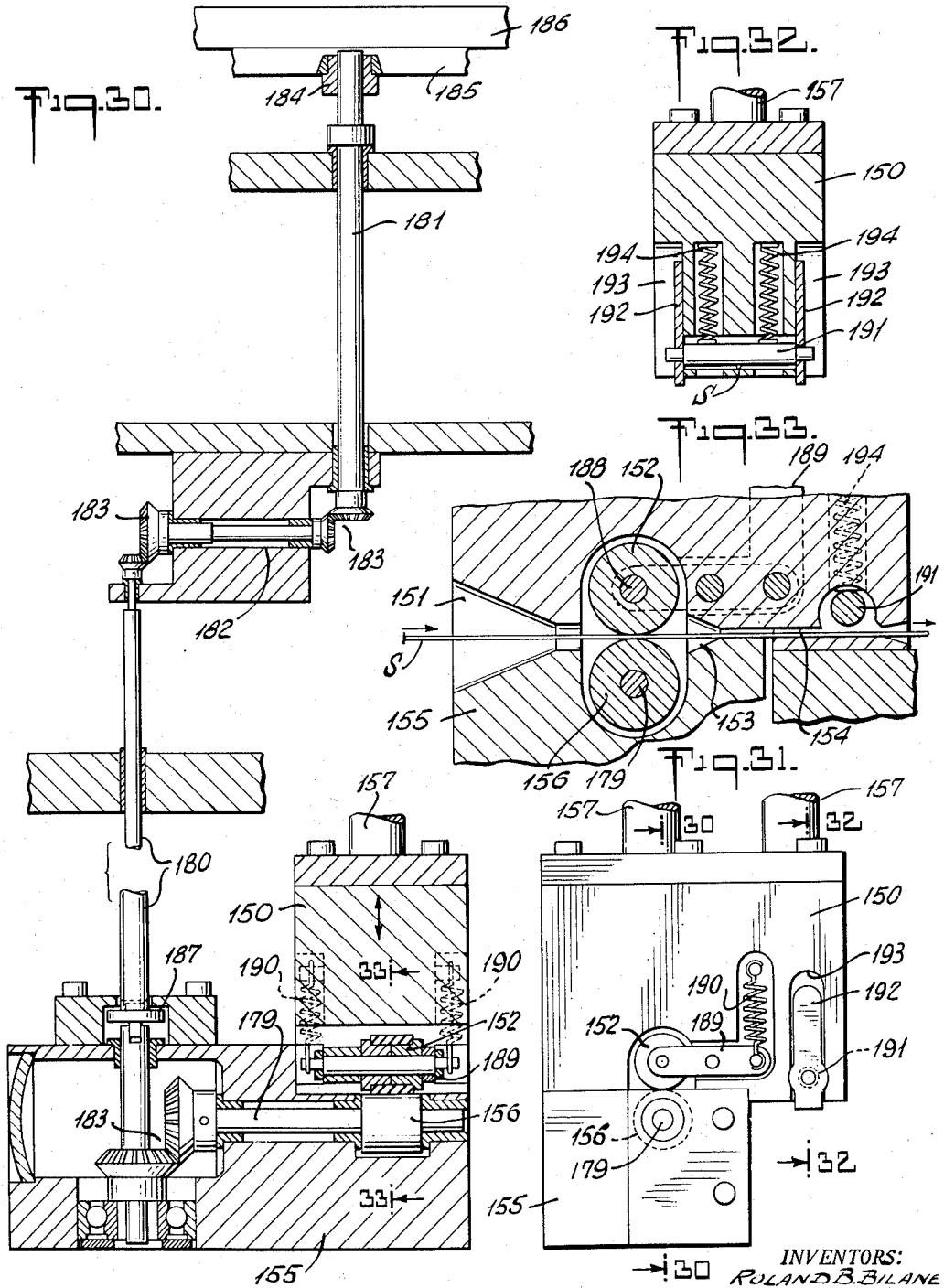

Dec. 20, 1955  R. B. BILANE ET AL  2,727,699
AUTOMATIC STRAND WINDING MACHINE
Filed May 17, 1952  19 Sheets-Sheet 13

INVENTORS:
ROLAND B. BILANE
GERALD J. BARRY
BY ROBERT J. SCHAEFER

Arnold S. Norfolk
ATTORNEY:

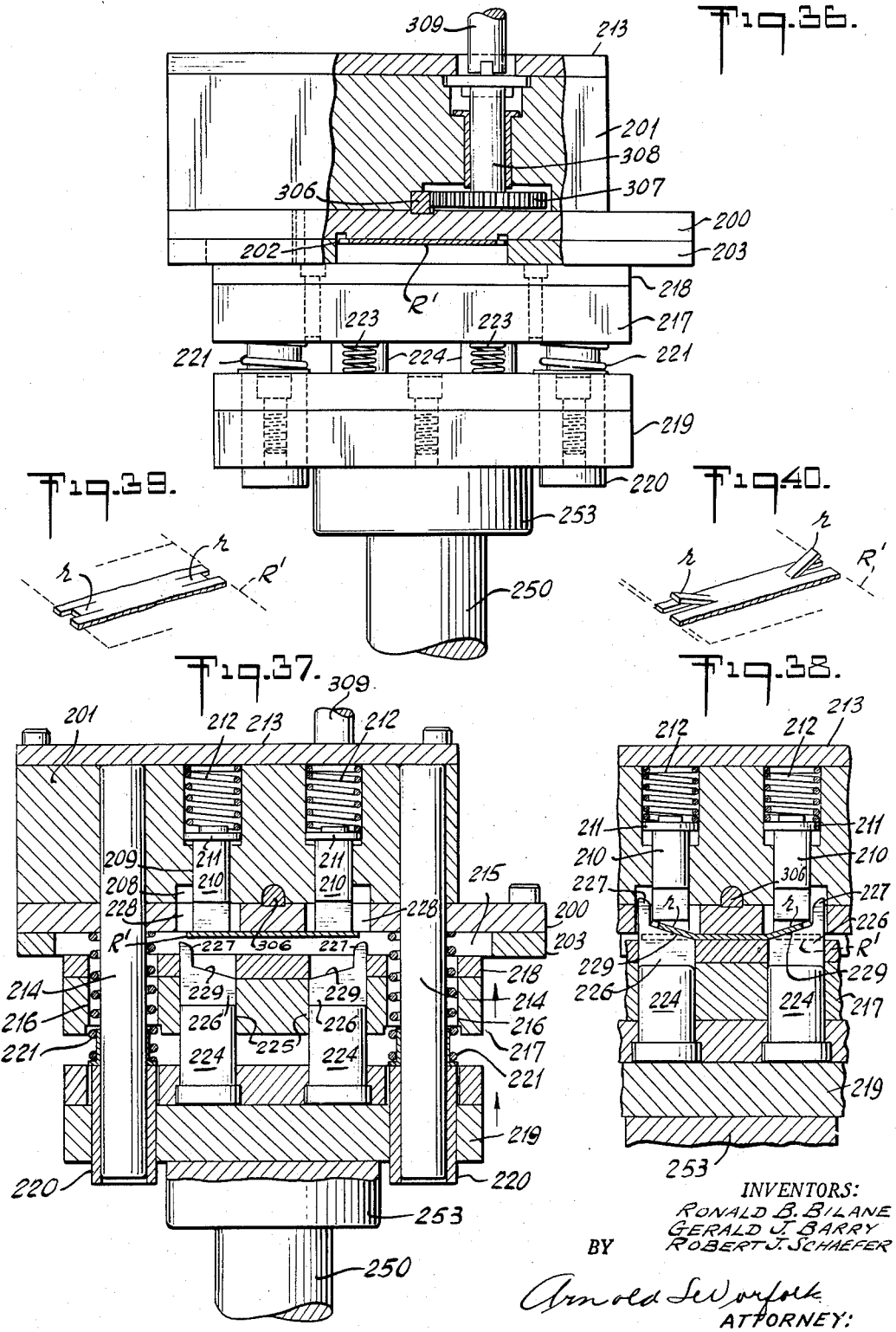

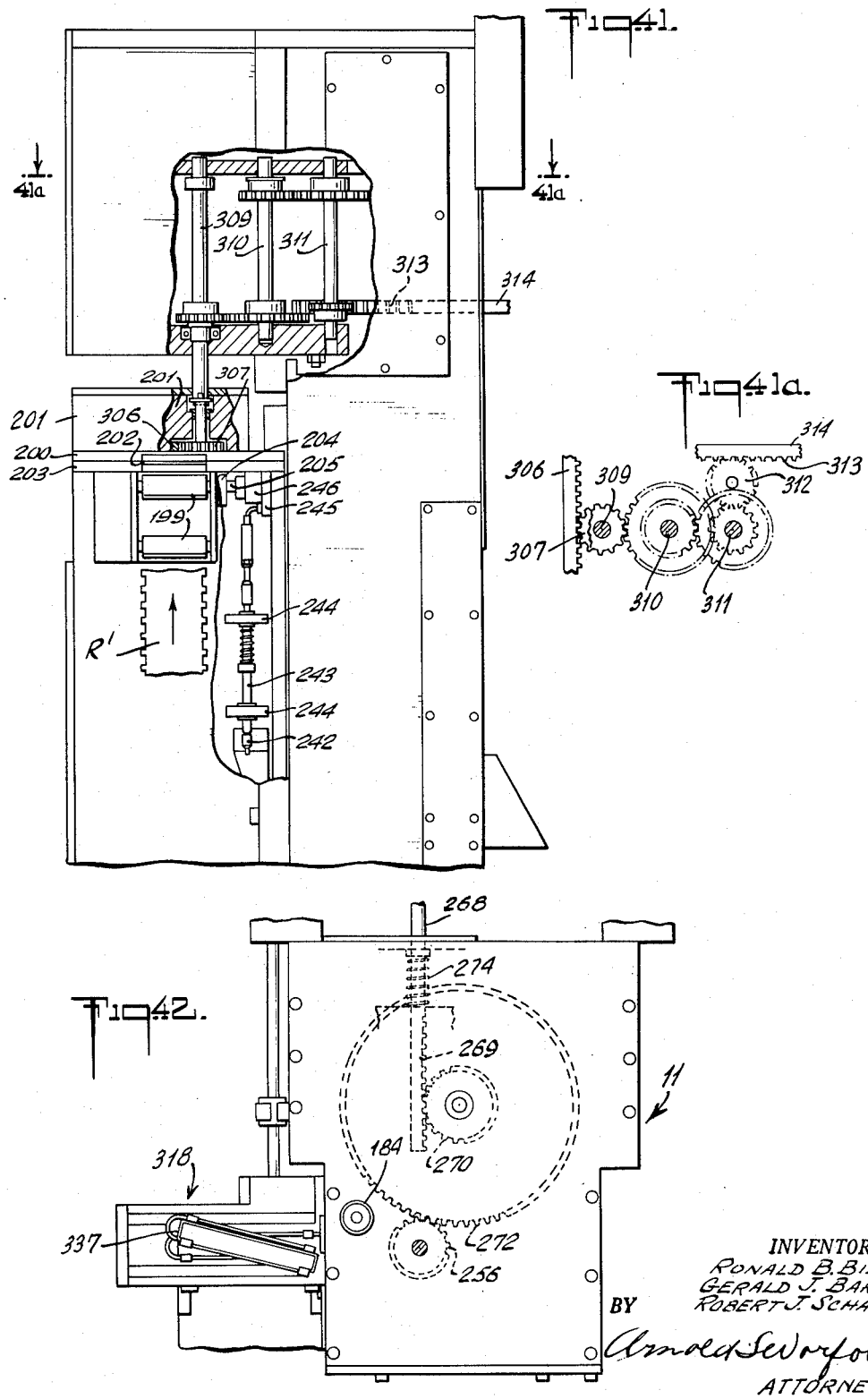

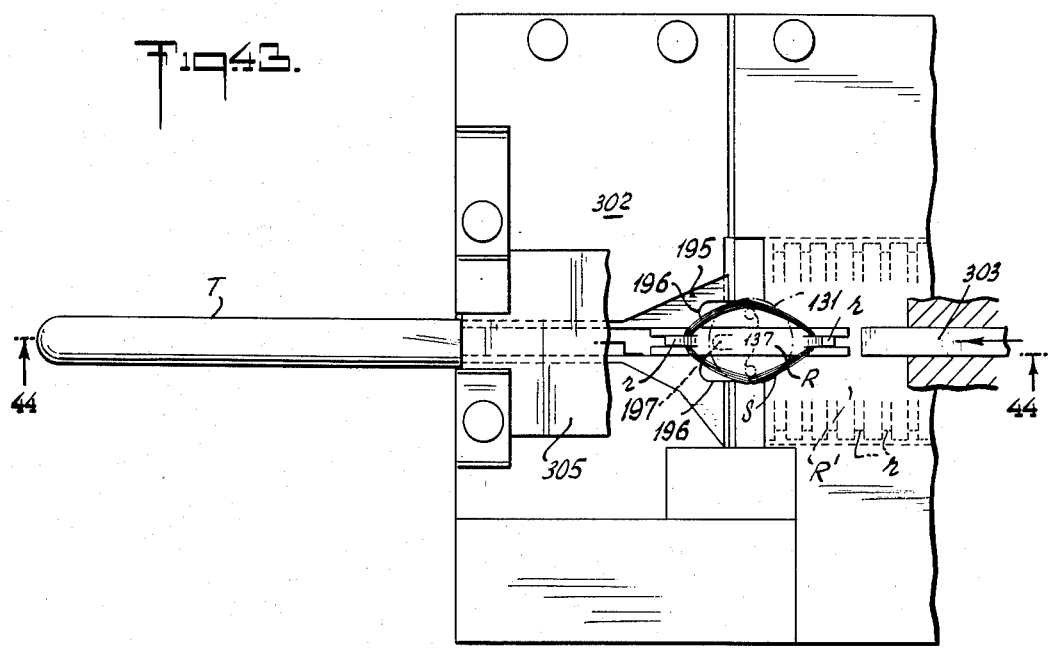
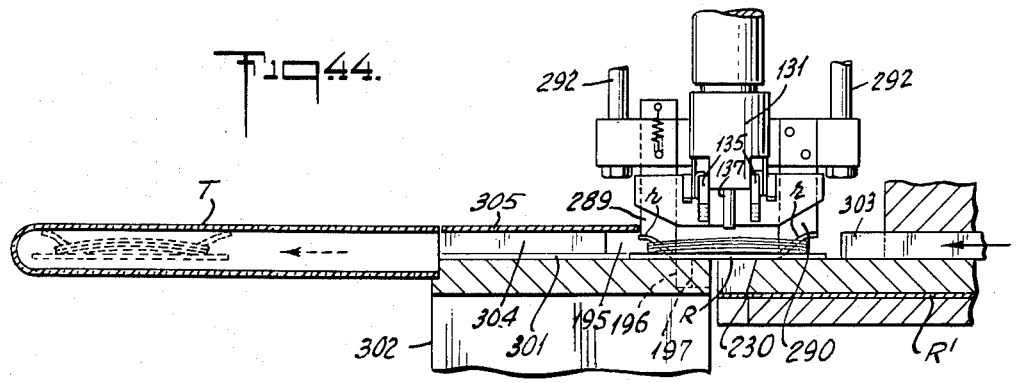
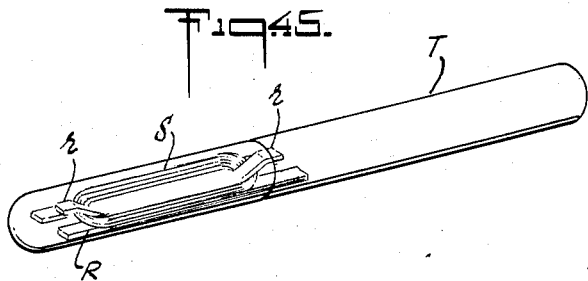

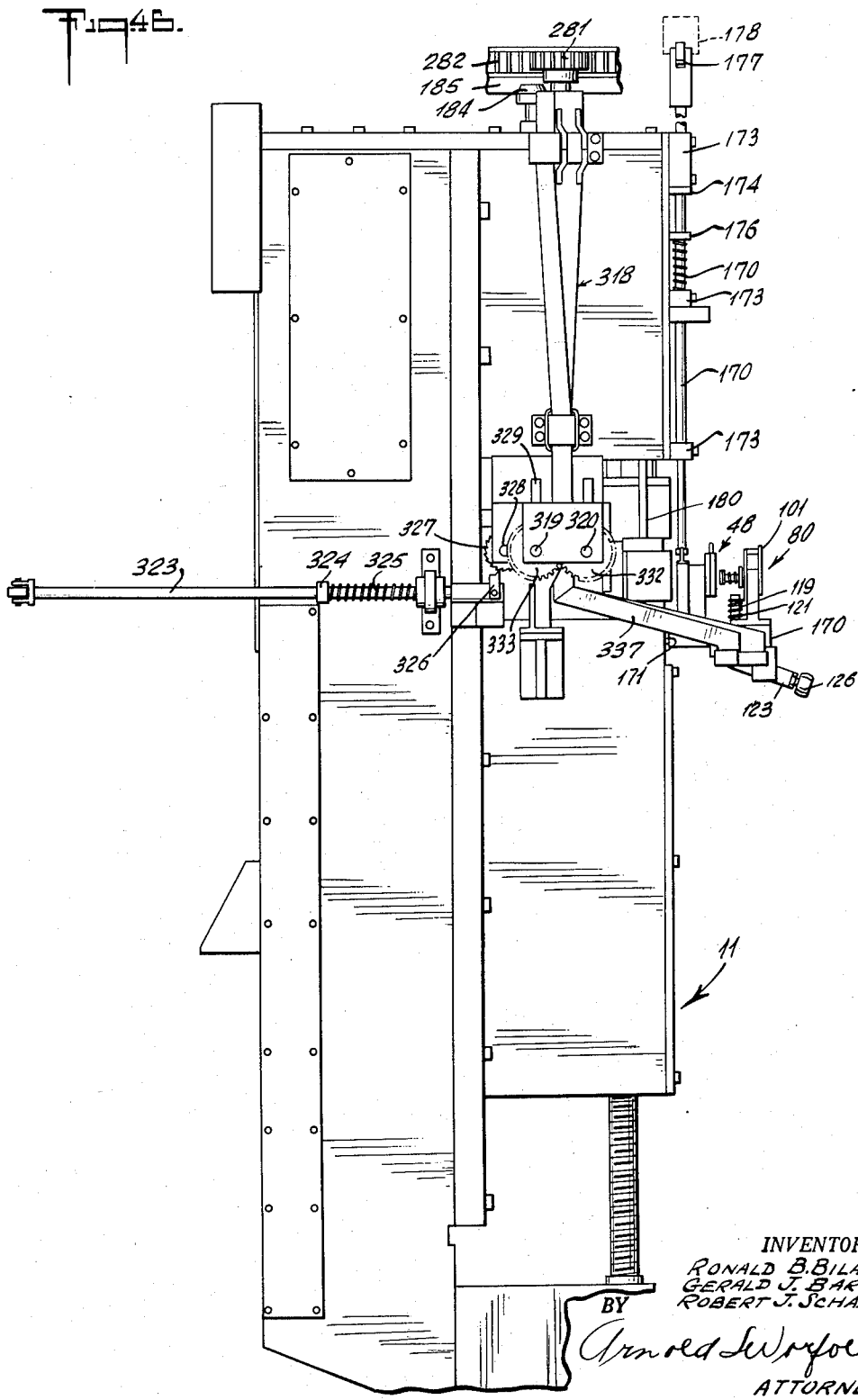

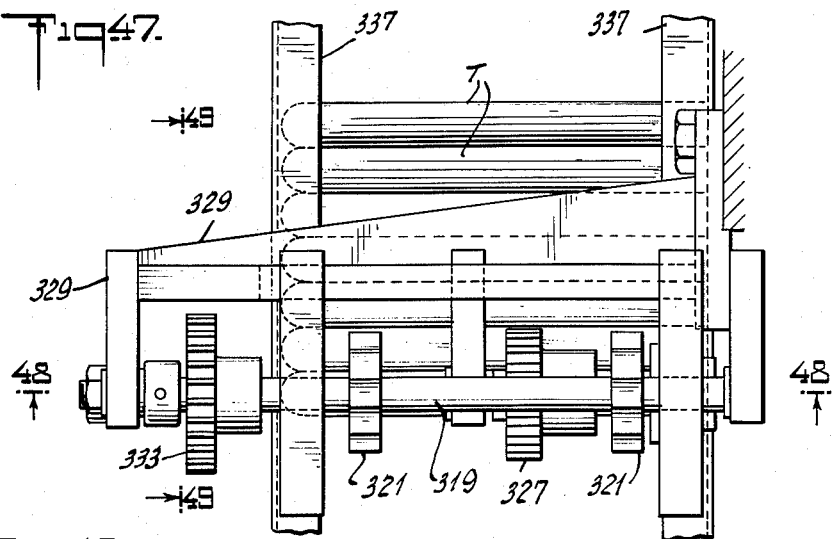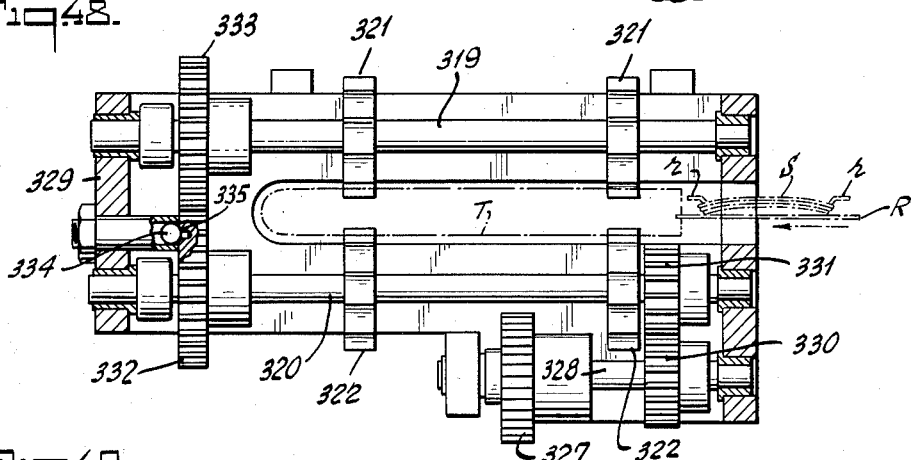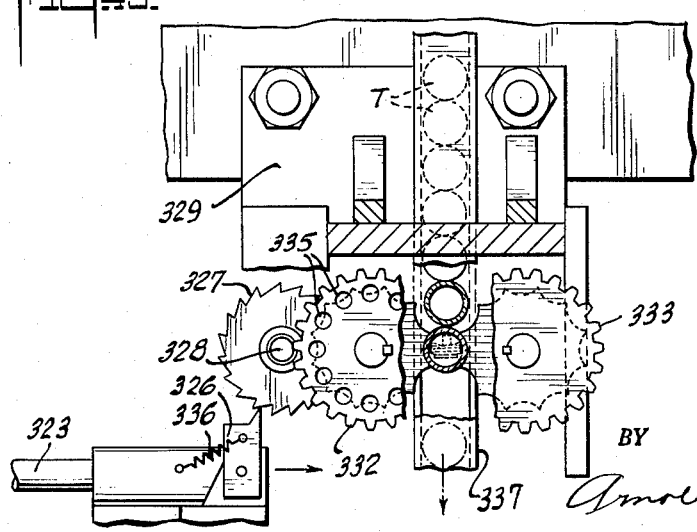

Dec. 20, 1955    R. B. BILANE ET AL    2,727,699
AUTOMATIC STRAND WINDING MACHINE
Filed May 17, 1952    19 Sheets-Sheet 19

INVENTORS:
ROLAND B. BILANE
GERALD J. BARRY
ROBERT J. SCHAEFER
BY
Arnold S. Worfolk
ATTORNEY.

United States Patent Office 2,727,699
Patented Dec. 20, 1955

2,727,699

AUTOMATIC STRAND WINDING MACHINE

Roland B. Bilane, West Keansburg, Gerald J. Barry, Old Bridge, and Robert J. Schaefer, Chatham, N. J., assignors to Ethicon, Inc., a corporation of New Jersey Application May 17, 1952, Serial No. 289,222

25 Claims. (Cl. 242—50)

This invention relates to a machine for automatically transferring flexible strands, one at a time, from a bundle of such strands, winding the strand on a reel, severed from a strip of reel stock, cutting the strand to predetermined length and inserting the reel with the strand wound thereon into a tube. The invention has particular utility for winding and tubing surgical sutures and is described in that connection.

According to the invention, a bundle of sutures of approximately desired length are arranged in a trough which terminates in a hopper adapted to receive the leading end portions thereof. The hopper has a suture supporting member and an overlying cover plate spaced apart a distance sufficient to accommodate one course only of the sutures. A back plates serves as an abutment to locate the leading ends of the sutures all in a predetermined position. The portions of the sutures in the hopper are moved sideways toward the outlet end thereof and then transferred one at a time to each of a series of clamping devices associated one with each of a plurality of winding frames equally spaced about a revolving turret for rotation past the hopper.

Each suture after the winding frame picks it up and proceeds on its way is fed by inward radial movement of the clamping device between a pair of feed rollers which in turn move it along to a position adjacent a winding head which in the meantime has been supplied with a reel having a pair of tabs formed therein and so disposed on the head that rotation thereof winds the suture on the reel and about the tabs. The reel is automatically cut off from a strip of reel stock, formed with tabs on which the suture is to be wound, and inserted at the appropriate time in the winding head.

Continued rotation of the turret winds the suture upon the reel in its respective winding frame until a predetermined point is reached in the machine cycle where mechanism is rendered active to cut off so much of the suture as will not have been fully wound up on the reel when the mechanism which effects winding has completed its cycle of operation.

After the suture is cut to length, winding thereof on the reel is completed, whereupon the reel with suture thereon is discharged from the winding head and the ensemble moved endwise into a tube of standard form which at one point in the machine cycle is fed into proper position to receive the wound up suture.

The operations of the machine are, in general, cam controlled, the cams for the most part being horizontally disposed on a fixed central shroud concentric with the axis of rotation of the turret which supports the various winding frames.

A better understanding of the machine may be had by referirng to the accompanying drawings wherein:

Fig. 1 is a top plan of a machine equipped with the present improvements and which has its top plate partially broken away to expose underlying parts;

Fig. 2 is a vertical section on line 2—2 of Fig. 1;

Fig. 3 is a vertical section on line 3—3 of Fig. 1;

Fig. 4 is an enlarged fragmental vertical section showing the manner in which the turret is supported for rotation;

Fig. 5 is an enlarged fragmental vertical section showing the manner in which the turret plates are connected together;

Fig. 6 is an enlarged top plan of the suture feeding hopper;

Fig. 7 is a front elevation of the suture feeding hopper looking in the direction of line 7—7 in Fig. 6;

Fig. 8 is an enlarged fragmental elevation of part of the mechanism shown in Fig. 7, partially broken away to show detail;

Fig. 9 is a horizontal section on line 9—9 of Fig. 7, some parts being broken away to show detail;

Fig. 10 is a vertical section on line 10—10 of Fig. 9;

Fig. 11 is a vertical section on line 11—11 of Fig. 9;

Fig. 12 is a fragmental perspective view of a portion of the suture supporting rail and showing detail of the air passageway;

Fig. 13 is an inverted plan of the suture feeding hopper shown in Fig. 6;

Fig. 14 is a vertical section on line 14—14 of Fig. 7;

Fig. 15 is a vertical section on lines 15—15 of Figs. 6 and 7;

Fig. 16 is a vertical section on line 16—16 of Fig. 17;

Fig. 16A is a horizontal section on line 16a—16a of Fig. 16;

Fig. 17 is a front elevation of a suture winding unit with the front plate partially broken away to show parts at the rear thereof;

Fig. 17a is an enlarged fragmental section on line 17a—17a of Fig. 16;

Fig. 17b is a horizontal section on line 17b—17b of Fig. 17a;

Fig. 18 is a vertical section on line 18—18 of Fig. 25;

Fig. 19 is a vertical section on line 19—19 of Fig. 18;

Fig. 20 is an elevation of the parts shown in Fig. 19 looking in the direction of line 20—20;

Fig. 21 is a plan view of the supporting bracket shown in Fig. 20;

Fig. 22 is an elevation of the suture guide and cut off device looking at the parts in the direction of line 22—22 of Fig. 25;

Fig. 23 is a vertical section on line 23—23 of Fig. 25;

Fig. 24 is a vertical section on line 24—24 of Fig. 25;

Fig. 25 is a vertical section on line 25—25 of Fig. 22 but with the suture clamping device shown in elevation;

Fig. 26 is a side elevation of the suture winding head and the reel tab forming mechanism looking at the parts from the left of the suture winding frame, the parts being shown in their normal positions;

Fig. 27 is a detailed elevation of the suture winding head;

Fig. 28 is a view of a portion of the mechanism shown in Fig. 26 but with the parts in the position in which the reel is inserted in the winding head;

Fig. 29 is a horizontal section on line 29—29 of Fig. 28;

Fig. 30 is a transverse section through the suture infeed rolls and through the train of connections which operate them, the parts being shown in their operative positions and the lower portion being taken on line 30—30 of Fig. 31;

Fig. 31 is a right end elevation of the parts shown at the bottom of Fig. 30;

Fig. 32 is a vertical section on line 32—32 of Fig. 31;

Fig. 33 is a fragmental fore and aft vertical section on an enlarged scale through the suture infeed rollers, the parts being shown in their operative or suture infeed position;

Fig. 36 is a right end elevation, partially in section, of the parts shown in Fig. 34;

Fig. 37 is a vertical section on line 37—37 of Fig. 35, the parts being shown in their normal positions;

Fig. 38 is a fragmental view of the parts shown in Fig. 37 but in their operative positions;

Fig. 39 is a perspective detail of a portion of the reel stock after tabs therein have been slit but returned to place;

Fig. 40 is a view similar to Fig. 39 but before the tabs have been returned to place;

Fig. 41 is a side elevation partly in section of a portion of a suture winding unit;

Fig. 41a is a diagrammatic view of the parts as they would appear in section on line 41a—41a of Fig. 41;

Fig. 42 is a top plan of a suture winding unit;

Fig. 43 is a top plan of the discharge funnel with associated parts and showing a reel with suture wound thereon about to be discharged into a suture tube;

Fig. 44 is a vertical section on line 44—44 of Fig. 43;

Fig. 45 is a perspective view of a tube after a suture and reel have been inserted therein;

Fig. 46 is a side elevation of a suture winding unit, showing details of the tube feeding and discharge mechanism;

Fig. 47 is a front elevation of the tube feeding and discharge mechanism;

Fig. 48 is a section on line 48—48 of Fig. 47;

Fig. 49 is a fragmental vertical section on line 49—49 of Fig. 47;

Figure 34:
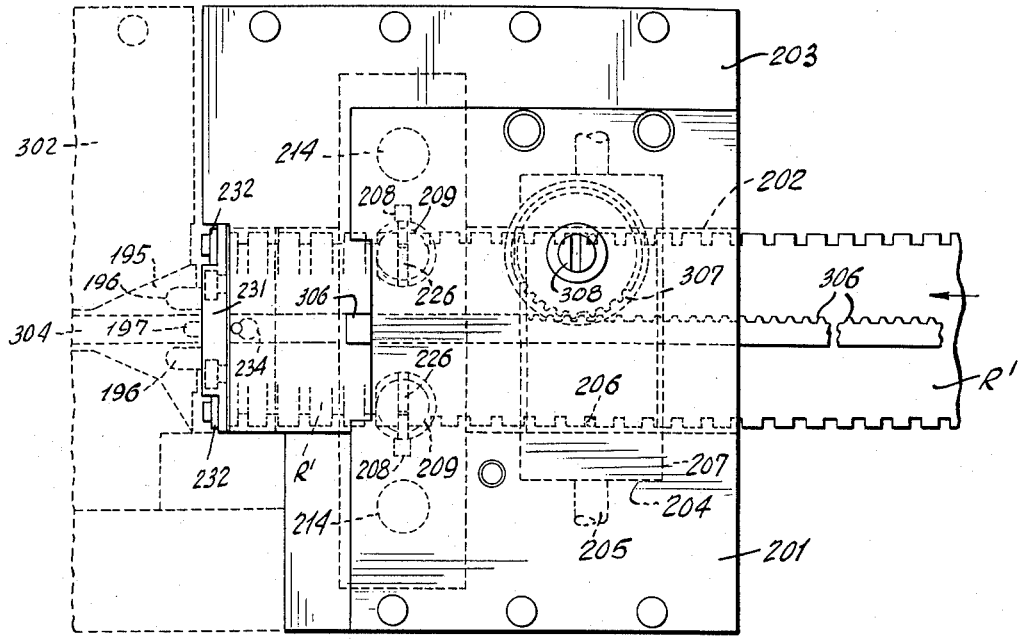
Fig. 34 is a top plan of the reel stock feeding tab forming and cutting device, the parts for inserting the reel in the winding head and the parts for discharging the reel with suture wound thereon from the winding head and into the discharge funnel, a portion of the discharge funnel being shown in dotted lines.

Referring to Figs. 1 and 3, there is shown a revolving turret 10 supporting, at equally spaced intervals therearound, a series of suture winding heads 11, arranged to rotate past the rear end of a horizontal trough 12 radially disposed with respect to the center of the turret and located somewhat above table height. The trough 12 preferably is made of sheet metal bent to shape (Fig. 2) and is provided at spaced longitudinal intervals along its length with a series of vertical pegs 13 alternately staggered about the longitudinal center line of the trough. A bundle of flexible sutures S such as surgical sutures, is disposed sinuously in the trough by winding it around each of such pegs between them and the nearer adjacent side of the trough, the arrangement being such that as the strands are pulled endwise out of the trough one at a time, sufficient friction is exerted on the remainder of the strands in the bunch so that tangling thereof is avoided.

The trough at its rear end, i. e., the end adjacent the turret, terminates in a hopper 14 (Figs. 1, 6 and 7) comprising in part, a vertical back plate 15, a horizontal base plate 16 extending from the left end to substantially the center of the back plate, a supporting rail 17 mounted at the front end of the base plate and which extends beyond it toward the right downwardly to the outlet end of the hopper, and a cover plate 18 (preferably transparent) overlying the supporting rail and which is spaced apart therefrom a distance slightly greater than the diameter of the sutures being handled so as to permit only a single course of the sutures to be accommodated between the rail and the plate. (See also Fig. 8.) The cover plate 18 continues toward the left for a short distance beyond the right edge of the horizontal base plate 16 so that between these two elements at this point, there is a wedged shape opening which facilitates insertion of the flexible strands laterally into the hopper 14. When this is accomplished, care is taken that the leading ends of the sutures engage the back plate 15 so that they will all have the same relative position as they pass through the hopper. The top plate is supported by and is secured to the underside of brackets 19 fixed to and which extend forwardly from the back plate.

The sutures in passing through the hopper, are moved down the inclined supporting rail 17 thereof by an air stream which edges the sutures along (Figs. 9, 10, 11 and 12). For this purpose, the supporting rail 17 is built up of four plates 20, 21, 22, 23 held together facewise, one behind the other, as by screws which pass through them and are threaded into the front face of the base plate 16 (Fig. 9). The two center plates 20, 21 are formed in their adjacent contacting faces each with a longitudinal groove 24 which extends from a horizontal fore and aft passageway 25 drilled through the plates, to a point of termination which is just short of the rightmost ends of the plates. These grooves are in registry and together constitute an air passageway 24. The plates are also provided in their upper adjacent edges with longitudinal recesses which together form a channel 26 open at the top and which extends from near the inlet end of the hopper to the outlet end thereof. This channel is connected with the air passageway 24 between the plates by a series of ducts 27 inclined upwardly and toward the outlet end of the hopper and formed by registering grooves likewise cut into the inner adjacent faces of the plates 20, 21.

The two center plates 20, 21 are likewise formed in their opposed outer faces each with a longitudinal groove 28 similar to those in the inner adjacent faces and which extends from the fore and aft passageway 25, to the right but which terminates not quite as far to the right as the passageway 24 between the plates. These grooves 28 are closed by the outer face plates 22 and 23 and constitute passageways which are connected each with the top central channel 26 by a series of ducts 29 cut into the outer opposed faces of the plates 20, 21 and which are inclined upwardly and toward the outlet end of the hopper. These ducts in turn are connected at their upper ends each with a horizontal duct 30 cut into the top edges of the center plates and which angles forwardly in the direction of suture feed and inwardly toward the channel 26. These horizontal ducts 30 in the respective central plates 20, 21 are positioned in staggered relation with respect to each other.

As previously stated the passageways 24, 28 are connected at the inlet end of the hopper with the fore and aft passageway 25 which is drilled through all the plates with the exception of the front outermost plate 23 and also partly through the base plate 16 of the hopper, rearwardly to a point of intersection with another horizontal passageway 31 drilled straight inwardly into the base plate from the left end thereof as shown in Fig. 9. This passageway connects with a source of air pressure not shown.

According to the arrangement just described, air blows in through the passageways 31, 25, 24, 28, and up through the ducts 27, 29, 30, converging in the channel 26 in a way such as to impinge on the sutures and urge them sideways along through the hopper to the outlet end thereof. Except for the support given by the rail 17, (i. e., the plates 20, 21, 22 and 23) the sutures are otherwise unsupported as they move through the hopper from the time they leave the base plate 16 until they near the outlet end of the hopper, where their ends engage the top of a small plate 32 secured to the bottom edge of, and which extends forwardly for a short distance from, the back plate 15 (Fig. 13).

At the outlet end of the hopper 14, in longitudinal registry with the air channel 26, there is a slide 33 arranged for vertical movement in a block 34 fixed to the back plate 15. (Figs. 6, 7, 8, 13 and 14). When the slide is in its topmost or normal position (Fig. 8), a horizontal notch 35 therein of size suitable to receive a single suture is located in position to receive a suture from the outlet end of the hopper 14. At the appropriate time in the machine cycle, the slide 35 moves downwardly to transfer the suture to another mechanism of the machine. As the suture is moved downwardly by the slide, its leading end is guided between a pair of fingers 36, 37 located substantially in fore and aft alignment with the slide 33. One of the fingers 36 depends from the small plate 32 that supports the end of the suture in the hopper and the other from a somewhat similar plate 38 secured at the underside of a base plate 39 forming part of a small frame supported by the back plate of the hopper.

The slide 33 is biased to its normal raised position by an encircling spring 40 which reacts between a collar 41 pinned to the slide at the top and the base of a recess 42 constituting an enlargement of a hole 43 which guides the slide in its up and down movement (Figs. 7 and 8). As each winding head revolves past the hopper, a cam 44 fixed at the front thereof engages the top end of an upwardly extending arm of a bell crank lever 45, fulcrumed on a bracket 46 supported by the frame, and rocks the lever in a direction to cause an adjustable banking screw 47 threaded through a forwardly extending arm of the lever to engage the top end of the slide 33 and move it downwardly. This projects the suture carried in the notch 35 of the slide into the path of a clamping device 48 carried on the winding head. The clamping device carries the strand out of the notch in a manner that hereinafter is described.

The slide 33, after its notch has been relieved of the suture, returns upwardly to its normal position ready to receive the next suture. This is accomplished by the spring 40 as the cam 44 on the winding head passes beyond the position of the bell crank lever 45. Incidentally, the bell crank lever has an anti-friction roller at the end of its upwardly extending arm, for engagement by the cam 44. An adjustable banking screw 49 in the lever supporting bracket 46 overlying the forwardly extending arm of the lever permits the notch in the slide to be properly aligned with the outlet end of the hopper. The banking screw 47 in the forwardly extending arm of the bell crank lever permits adjustment in the lowermost position of the slide.

The winding head turret frame comprises in part a base plate 50 and a central vertical fixed supporting standard mounted thereon which includes a lower cylindrical sleeve 51 and an upper shaft 52 telescoping therein and fixed in place (Figs. 1, 3, 4 and 5). The turret frame further includes a horizontal circular plate 53 fixed at the top of the center shaft. The turret itself includes horizontal top and bottom circular plates 54, 55 held together in spaced relation by long vertical tie rods 56 encased in spacing sleeves and disposed at suitable intervals around the plates near their peripheral edges. The plates 54, 55 are journaled for rotation on the vertical shaft 52 and are supported for rotation on a plurality of roller bearings 57 angularly spaced about the vertical shaft on short horizontal studs 58 mounted near the top of a corresponding series of vertical posts 59 stationary on a horizontal shelf 60 fixed to and encircling the lower cylindrical sleeve support (Fig. 4). A bearing ring 61 fastened to the lower plate 55 at its underside presents a track for the roller bearings 57, and it also presents in its outer peripheral edge, a ring gear 62 which meshes with a pinion 63 disposed at the upper end of a vertical shaft 64 driven through a reduction gear 65 from a source of power, not shown. The vertical shaft is supported for rotation near its upper end in a journal 66 mounted on an angular bracket 67 fixed at the top of the horizontal supporting shelf 60.

The suture winding heads 11, of which the present machine has six, are equally spaced about the turret plates to which they are secured at the top and bottom by suitable brackets 68. They include mechanisms for the performance of different functions subsequently to be described and which are controlled from a gang of horizontal cams fixed on a cylindrical shroud 69 secured to the central supporting shaft 52 between the upper and lower rotating turret plates 54, 55.

At the outer face of each of the suture winding units, there is provided mechanism, including the clamp 48 previously alluded to, which acts as the turret rotates and as the head passes the hopper, to pick up the suture which was moved downwardly by the slide 33 under the action of the cam 44. This mechanism includes a small platform 70 mounted at the outer end of a pair of horizontal parallel slides 71 supported for sliding movement in a radial direction in the winding unit (Figs. 1, 3, 6, 14, 17, 18, 19, 20 and 21). The slides are equipped each with a collar 72 about midway of its length which serves as an abutment for a spring 73 reacting between it and a fixed abutment 74 near the front of the winding unit to retain the slides and consequently the platform in its innermost position (Fig. 16). A yoke 75 at the rear end of the slides secures them together for integral movement. Inwardly of the slides and in longitudinal alignment, therewith, is a push bar 76 guided for sliding movement in a boss 77 integral with the frame of the winding unit. The innermost position of the push bar to which it is biased by a spring 78 is determined by the banking of a stop nut at the outer end of the bar against the outer end of the boss 77. Normally the slides 71 and the push bar 76 are in their innermost positions. However, during rotation of the turret and as the winding unit approaches the hopper 14, the rear end of the push bar 76 rides up on a high portion of a horizontal edge cam 79 fixed on the shroud 69, causing the slides 71 to move outwardly and locate the platform 70 in a position to pass beneath the suture hopper. (Fig. 6).

On the platform 70, there are two devices. One is the device 48 previously mentioned for clamping the suture and the other is a device 80 for guiding the suture as it is pulled along during the reeling up process and for cuttnig the suture to fixed length ( Figs. 1 and 3). The clamping device is the inner and the guiding and cutting device the outer with reference to the winding head.

The clamping device comprises a vertical standard 81 mounted on the platform 70 and whose front edge, having reference to the direction of rotation of the turret, slopes upwardly and rearwardly to a level approximately the same as that of the suture when it has been moved to its lowermost position by the ejection slide 33 of the hopper (Fig. 14). The standard, at its upper rear, has a slot 82 disposed parallel to the sides of the standard, to accommodate for rotation therein, a vertically disposed disc-like member 83 having an integral hub 84 which is journaled in the walls of the slot (Figs. 18, 19, 20 and 21).

The disc 83 is cut away in one portion of its edge to present a U-shaped notch 84 circumferentially disposed with respect to the axis of rotation of the disc, and whose open end, when the disc is in its normal position, faces forward and is located above the top surface of the standard which here is provided with a rubber cushion or pad 85 cemented in place. A spiral spring 86 flat against one face of the standard has one end disposed in a longitudinal slot cut in one end of the hub 84 which protrudes beyond such face, and its other end anchored to the standard. The spring is loaded to rotate the disc in a counterclockwise direction, looking toward the center of the machine, but the disc normally is held against rotation by a horizontal pin 87 disposed transversely with respect to the disc 83 and in the path of an abutment 88 presented in the lower peripheral edge of the disc. The pin is fixed in and near the bottom of a rod 89 guided for vertical movement between a pair of plates 90 drilled for the purpose and which are fixed on and at one side of the standard 81. A cross pin 91 extending through the rod 89 and into adjacent slots 92 in the guide plates prevents the rod from turning, and a spring 93 reacting between the cross pin and the bottom of an elongated vertical recess 94 in the guide plates through which the rod extends, urges the rod to its topmost position where the transverse pin 87 engages the abutment 88 on the disc.

However, when the platform 70 on which the clamp is mounted passes beneath the hopper 14, the suture which has been removed therefrom by the slide 33, rides up the front edge of the standard 81 onto the rubber platform 85 thereon and opposite the opening of the U-shaped slot, and simultaneously therewith, the vertical rod 89 engages a cam plate 95 fixed on the bottom of the hopper frame, and is moved downwardly thereby, to displace the transverse pin 87 out of the way of the abutment 88 on the disc 83. The disc 83 thereby is released and rotates under the action of the spring to clamp the suture between the rubber pad and the base of its U-shaped slot. The clamp holds the suture somewhat inwardly from its end and, as the turret rotates, pulls the suture individually out of the trough through a hole 130 provided in the bottom thereof adjacent the hopper (Fig. 6).

At approximately the same time as the strand is clamped in the manner just described, it is also located in the guide mechanism 80 which will now be described.

The guide mechanism 80 includes a standard 97 whose leading edge slopes upwardly and rearwardly from the platform 70 on which it is mounted, in much the same manner as the standard which supports the clamp (Figs. 22, 23, 24, 25). The standard is formed near the top of its leading edge with a relatively deep V-shaped notch 98 whose lower edge slopes slightly toward the rear downwardly to provide a supporting ledge 99 for the suture.

A horizontal shaft 100 extending transversely through the standard 97 supports a disc member 101 adjacent the outer face of the standard. In its upper edge the disc 101 is formed to present a forwardly extending finger 102 which defines a relatively large recess 103 in the body of the disc. A coil spring 104 supported on a horizontal pin 105 projecting from the face of the standard has one end anchored to the standard and its other end reacting against a horizontal pin 106 projecting from the face of the disc. This spring tends to rotate the disc in a counterclockwise direction looking in towards the center of the machine. The disc 101 is located in its normal position by a transverse pin 107 extending through a slot in the standard and into the path of an abutment 108 presented in the lower edge of the disc. In this position of the disc, the finger 102 stands clear of the notch 98 in the standard so that the strand can enter therein.

Adjacent the opposite or inner face of the standard there is fixed a plate 109 having a V-shaped notch similar to and in registry with the notch in the standard. The lower edge of this notch is suitably ground to serve as an anvil for a cut-off knife. The cut-off knife is presented by a disc member 110 rotatably mounted adjacent the outer face of the anvil plate and on the transverse shaft 100. The disc has its periphery cut away to present an edge 111 extending generally in a radial direction outwardly from the center. This edge is ground to form the cut-off knife. The disc 110 is located in its normal position by the same horizontal pin 107 that determines the normal position of the disc 101 previously described and which stands in the way of an abutment 112 likewise presented in the lower edge of the knife disc. In this position of the parts knife edge 111 stands clear of the notch 98 in the standard so as not to interfere with the entry of the suture into the notch. The abutment 112 on the knife disc is urged against the pin 107 by a spiral spring 113 whose inner end projects into a longitudinal slot 114 formed in the shaft 100 and whose outer end is anchored to a pin 115 projecting from the face of the disc. The two discs 101, 110 and the standard 97 are yieldingly held together so that the knife edge will properly cooperate with its associated anvil by the shaft 100 which for this purpose has an abutment 116 at one end holding a washer facewise against the outer disc 101 and by a spring 117 which encircles the shaft and reacts between the outer face of the knife disc 110 through a pair of intermediate washers spaced apart by the spiral spring 113, and a pair of lock nuts 118 threaded on the adjacent end of the shaft.

The transverse pin 107 which determines the normal position of the guide and the knife discs 101, 110 is carried at the upper end of a sliding rod 119 which passes through the platform 70 and which is guided for vertical movement in a bushing 120 fixed therein. The rod 119 normally is held in its uppermost position by an encircling compression spring 121 which reacts between the upper end of the bushing and an overlying abutment 122 fixed on the rod near its upper end.

The rod 119 is moved in a vertical direction by a lever 123 fulcrumed near its center on a bracket 124 secured at the bottom of the platform 70. The lever has one end bifurcated to straddle a transverse pin 125 in the lower end of the rod and its other end equipped with an anti-friction roller 126 for cam operation. Shortly after the suture is grasped by the clamp 48 as previously described and after it has entered the notch 98 in the standard as the platform passes beneath the hopper, the anti-friction roller 126 engages a cam plate 127 fixed on the outer machine frame which rocks the lever 123 through a distance enough to withdraw the transverse pin 107 downwardly out of the path of the abutment 108 in the guide disc 101, but not enough to clear the abutment 112 on the knife disc 110 which is substantially longer. As the pin 107 clears the abutment 108, the guide disc 101 rotates in a counterclockwise direction under the action of its associated spring 104 through a distance sufficient to cause the finger 102 to close off the outer portion of the notch 98 in the standard to form a closed thimble defined by the lower edge of the notch in the standard and the inner edge of the finger and through which the suture is easily guided. This position of the guide disc 101 is determind by a horizontal pin 128 fixed in such disc and which projects from it laterally through an elongated circumferential notch or slot 129 in the knife disc 110. In the normal position of the parts, the pin 128 is located at the lower end of the slot 129, but when the guide disc 101 is released in the manner previously described, the pin 128 moves until it banks against the upper end of the slot 129. The rotational movement of the guide disc is thus arrested. The knife disc 110 at this stage of the machine operation is retained in its normal position by the engagement of its abutment 112 with the transverse pin 107 which, after the guide disc 101 has been triggered and after the anti-friction roller has left the cam, merely rests against the lower enlarged circumferential portion of the guide disc.

As soon as the suture has been gripped by the clamping mechanism 48 and as the turret continues its rotation which serves to pull such suture out of the trough 12 through the opening 130 in the bottom thereof near the hopper, a depression in the cam 79 which controls the operation of the slide 71 on which the platform 70 is mounted, permits the platform to move inwardly toward the suture winding mechanism (Figs. 6 and 17).

The suture winding mechanism includes in part a vertical spindle 131 whose lower cylindrical end is cut away to accommodate a pair of parallel vertically disposed transverse plates 132, 133 which are fixed in facewise contact on the spindle symmetrically with respect to its center line (Figs. 16, 17, 17a, 17b, 26, 27, 28, 29). The plates are larger in horizontal dimension than in height. One of the plates is thicker than the other, but this plate, in the end portions thereof which extend laterally beyond the spindle are cut away to about the thickness of the other plate so as to provide a vertical slot 134 of constant width between the plates in such areas. The lower edges of the plates are horizontal for about the middle half of their lengths and beveled upwardly at their ends. In general, the head is designed to accommodate at its bottom, an elongated reel R of flat stock and to hold such reel in place during the winding operation by frictionally engaging a pair of tabs r centrally disposed at the ends of the reel and which are pressed up from the stock and into the slots 134 between the plates 132, 133.

The spindle 131 is also cut away at its lower end to accommodate a pair of vertical clamping fingers 135 equally spaced about the center line of the spindle and located at one side of the reel holding plates 132, 133 (Figs. 27, 29). The fingers 135 are pivotally mounted on the spindle and have depending portions whose inner vertical edges are spring pressed into engagement with the flat side of the adjacent reel holding plate 132. The fingers also have outwardly extending nose portions 136 whose purpose as well as that of a pair of vertical pins 137 projecting downwardly from the bottom of the spindle to a point just slightly below the bottom of the reel holding plates, at corresponding centrally located positions on the opposite sides of the plates, subsequently will be dscribed.

The spindle 131 is journaled for rotation in bearings 138 arranged in a quill 139 which is guided for vertical movement at the top in a sleeve 140 and at the bottom in a sleeve 141 both fixed in the machine. The bearings 138 are mounted in the quill in a way such that the spindle partakes of the same vertical movement of the quill.

The quill 139 is adjustable to three different levels, a top or normal level in which the spindle is rotated to wind up the suture, a bottom level in which the suture is threaded into the winding head, i. e., the plates 132, 133 and their associated elements, and an intermediate position in which the reel with the suture wound thereon is discharged from the winding unit.

The quill and consequently the spindle, is held in its top or normal position by a square collar 142 fixed to and encircling the quill 139 and which is pressed upwardly against the lower end of the fixed collar 140 by a compression spring 143 surrounding the quill and which reacts between the bottom of the collar 142 and an external flange presented by the fixed sleeve 141.

At the beginning of a machine cycle of operation, the quill is located at its normal level and the plates of the suture winding head are disposed in a fore and aft direction in which position they are locked against rotation by means subsequently described.

As the suture to be wound is being picked up by the clamp 48, the suture winding head is moved to its lowermost position. This is accomplished by the outward movement of a horizontal radially disposed push rod 144 whose inner end, as the turret rotates, arrives opposite the high portion of a cam 145 located on the fixed shroud 69 (Figs. 3 and 17). The rod 144 is guided for sliding movement in a block 146 fixed to the frame and its front end engages the upwardly extending arm of a bell crank lever 147, fulcrumed on the frame and which has two horizontal arms extending forwardly from the fulcrum into overlying engagement with a pair of pins 148 projecting laterally at diametrically opposed points from the collar 142. The rod 144 moves outwardly against the reaction of a compression spring 149 located between a collar on the rod and a fixed portion of the frame, and as it does, it rocks the lever 147 to move the quill and consequently the spindle 131, against the reaction of the spring 143, to their lowermost positions.

At the same time that the spindle moves downwardly, a block 150 located directly in front of the winding head moves downwardly too (Figs. 17, 26, 30, 31, 32, 33). This block presents in its lower face, the upper half of a funnel-shaped inlet aperture 151, the upper roll 152 of a pair of superimposed horizontal feed rolls, and the upper half of a smaller funnel-shaped aperture 153 as well as the upper half of a guide way 154 leading in toward the winding head. When the block 150 is in its lowermost position, it engages an underlying fixed block 155 whose upper face presents the lower half of the funnel-shaped aperture 151, the lower roll 156 of the pair of superimposed horizontal feed rolls, the lower half of the smaller funnel-shaped aperture 153, and the lower half of the guide way 154.

The block 150 is carried at the lower end of a pair of rails 157 guided for vertical sliding movement in fixed parts of the machine frame (Figs. 16 and 17). The rails are yoked together at the top by a block 158 provided with a vertical rack 159 which meshes with a pinion 160 on a horizontal shaft 161 journaled in a fixed block 162 and on which there is fixed another pinion 163 meshing with a rack 164 formed on a horizontal radially disposed rod 165 whose inner end tracks along a horizontally disposed cam 166 on the shroud 69.

The configuration of the cam 166 is such that it pushes the rod 165 forwardly at about the same time that the spindle moves downwardly. The forward movement of the rod 165 through the connection described, moves the block 150 into engagement with the underlying block 155 so as to establish the lead in channel for the suture and the cooperative relationship of the feed in rolls 152, 156, as previously described. The downward movement of the block 150 is against the load of a compression spring 167 encircling the front rail 157 and reacting between a collar 168 fixed on the rail and an underlying fixed part of the winding frame. It should also be noted that the push rod 165 is made of two telescoping parts with an intermediate spring 169 so as to permit the parts to yield should some obstruction be presented to the proper seating of the block 150 on the block 155 (Fig. 16).

It will be recalled now that the spindle 131 and the block 150 are moved to their lowermost position preparatory to receiving the suture held in the clamp 48 and which is fed into the feed rolls 152, 156 by the inward movement of the platform 70. The platform feeds the suture at a speed somewhat greater than the speed of feed of the rolls 152, 156. Consequently, when the platform has reached the inner end of its stroke some slack will have been produced in the suture between the clamp and the feed rolls. As this slack is being taken up, the clamp is opened so that the rolls 152, 156 may continue with the feed of the suture.

The clamp 48 is opened by the downward movement of a vertical rod 170 located at the front of the winding unit and whose lower end has a laterally extending finger 171 which overlies a stud 172 projecting laterally from the clamping disc 83 when the clamping mechanism is in its innermost position (Figs. 16, 18, 19, 20). As the rod 170 moves downwardly, it acts through the stud 172 to rotate the clamping disc in a clockwise direction, looking toward the center of the machine, back to its normal position or until the abutment 88 on the lower edge thereof clears the pin 87 on the vertical slide rod 89. The rod 89 thereupon moves upwardly under the action of its associated spring 93 to locate the pin in advance of the abutment and hold the clamping disc in its normal position.

The rod 170 is guided for vertical movement in spaced brackets 173 secured on the front face plate of the winding unit, is provided with a fixed collar 174 which abuts against the bottom of the topmost guide bracket to determine its topmost position, and its downward movement is against the load of a compression spring 175 which reacts between a collar 176 fixed on the rod and an underlying bracket 173. The rod 170 is equipped at its upper end with an anti-friction roller 177, which engages an overlying fixed cam 178 secured to the underside of the machine top plate at the appropriate location to cause the descent of the rod and recocking of the clamping device as soon as the platform 70 reaches its innermost position. The rod 170 is restored to its normal position by its associated spring 175 as soon as the anti-friction roller 177 rides off the overlying cam 178.

With regard to the feed rolls which take over the infeeding of the suture, the lower one 156 is driven whereas the upper one 152 merely rests upon the suture with pressure to provide friction for the feed (Fig. 30). The lower roll 156 is driven in a direction to effect inward movement of the suture and for this purpose it is arranged on a shaft 179 journaled in the block 155 and driven by a train of driving connections which includes two vertical shafts 180 and 181 each journaled at top and bottom in the winding frame, and an intermediate horizontal shaft 182 likewise journaled in said frame, all interconnected by pairs of beveled gears 183. The upper shaft 181 is equipped at the top with a wheel 184 with friction tire arrangement edgewise to engage a circular track 185 fixed to the underside of a large ring 186 secured to the underside of the main frame top plate 53. (See also Figs. 3 and 16). Preferably the lower vertical shaft 180 is in two parts with a self-aligning connection 187 intermediate its ends to facilitate endwise separation of the parts when necessary. The circular track 186 at the top extends only for a distance sufficient to feed the strand into a position adjacent the winding head.

The upper feed roll 152 is fixed on a shaft 188 journaled in corresponding ends of a pair of centrally fulcrumed rocker arms 189 whose opposite ends are biased by springs 190 in an upward direction in order that the upper roll 152 which is rubber-surfaced will accommodate itself to sutures of different diameters and exert sufficient pressure on the strands to insure proper feeding between the rolls 152, 156.

As the leading end of the suture emerges from between the feed rolls 152, 156 it is guided by the second funnel-shaped opening 153 into passageway 154 whose rear portion beyond the end of the block 155 is entirely within the block 150. This passageway leads the suture beneath another roll 191 whose purpose, when active, is to exert a desired amount of drag on the suture during the winding up process (Figs. 32 and 33). The roll 191 is journaled at its end in a pair of vertical plates 192 which are guided for limited sliding movement in vertical slots 193 recessed into the opposed lateral faces of the movable block 150. A pair of compression springs 194 contained in overlying vertical recesses press down on the roll 191. However, when the block 150 is in its lowermost position during the infeed of the suture by the feed rolls 152, 156, the lower ends of the plates 192 which support the drag roll 191 bank against an underlying fixed block to raise the drag roll clear of the incoming suture so that it may pass beneath without interference.

The suture is moved ahead endwise by the feed rolls 152, 156 until the leading end thereof lies between the pivoted clamps 135 and the plate 132 immediately adjacent on the winding head, the clamps previously having been rocked to permit passage of the suture between the plate and the vertical edges of the clamps when the winding head was moved to its lowermost position. The clamps are rocked to receive the suture by the engagement of their nose portions 136 with an underlying fixed plate 195 which is provided with recesses 196 to accommodate the depending portions of the clamps, and a recess 197 to accommodate one of the depending pins 137 on the winding head (Fig. 43).

When the winding head is raised to winding position, the clamps spring back to their normal positions to grip the suture against the adjacent plate of the winding head.

When the winding head is in its lowermost position, a reel R on which the suture is to be wound is inserted into the head. The way in which the reels are brought to the head and the manner of their insertion will now be described.

Figure 35:
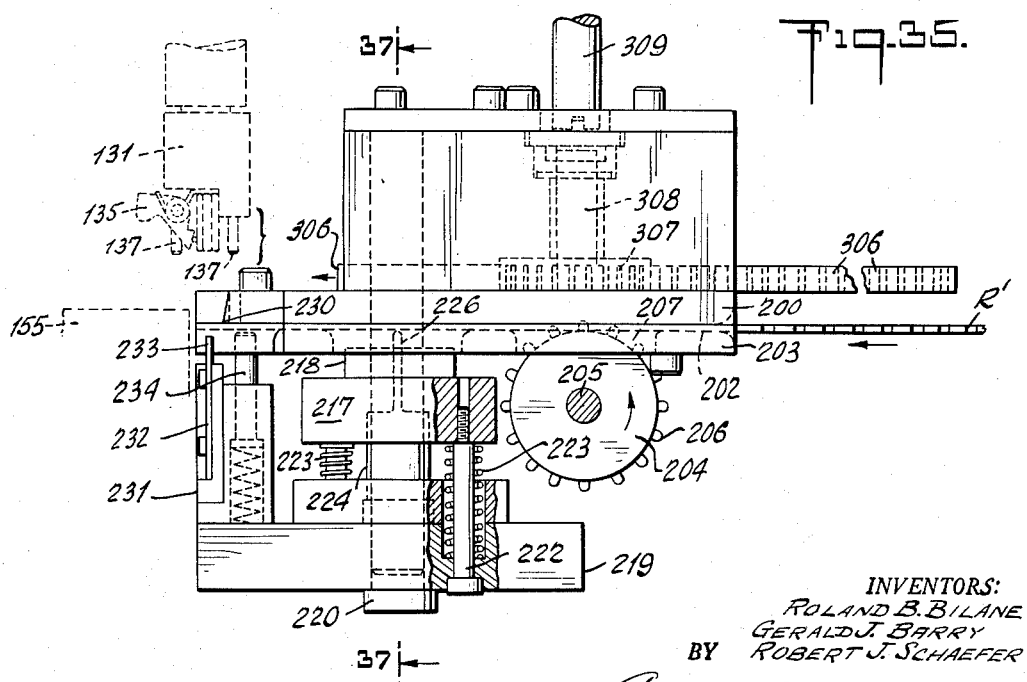
Fig. 35 is a front elevation of the parts shown in Fig. 34.

Near the bottom of each strand winding unit 11, there is a cylindrical drum 198 for accommodating a strip of fiber reel stock R' which is uncut except that it is notched at regularly spaced intervals along its opposite edges (Figs. 16, 34, 35). Opposite notches are in transverse alignment and ultimately the strip R' is severed midway between each pair of notches to provide the individual suture reels R.

From the supply reel, the notched strip R' proceeds upwardly over a pair of rollers 199 supported by a bracket fixed on the winding unit approximately at the level of the winding head in its lowermost position. The strip R' is fed endwise in from the right (looking inwardly toward the center of the machine) through a horizontal channel defined at the top by a die plate 200, secured at the underside of a block 201 fixed in the winding unit, and at the bottom by a recessed portion 202 of a plate 203 secured to the die plate at the bottom (Figs. 34, 35). After the strip of reel stock R' enters the channel, which is flared at its entrance end to permit ready insertion thereof, it passes over a roll 204 mounted on a horizontal shaft 205 extending in a fore and aft direction in the winding unit and journaled for rotation therein. The roll 204 is provided with two sets of sprockets 206 whose teeth are spaced circumferentially and longitudinally on the roll so as to engage in the notches presented in the lateral edges of the strip R'. A recess 207 in the plate 203 permits the roll access to the strip.

At the beginning of each machine cycle of operation, the roll is rotated through a distance of one sprocket to advance the strip a distance corresponding to the width of a single reel. This advances a portion of the strip, in which tabs have previously been slit but pressed back into the plane of the body of the strip, beneath the winding head. Thereupon mechanism operates to cut off the reel so located and insert it in the winding head. Since the mechanism for effecting this operation is part of mechanism for preslitting the tabs in the reels, the preslitting mechanism first will be described.

To the left of the sprocket feed, there is provided mechanism for slitting the reel stock R' inwardly from the edges thereof along lines coincident with the side faces of the notches therein and for a short distance inwardly from the ends of the stock to provide bent up tabs r (Figs. 34-40). This mechanism includes in part the die plate 200 and the overlying block 201. The die plate is formed with vertical slots 208 having the outline of the tabs at the positions where the tabs are to be cut, and the block is formed with circular holes 209 above the slots in the die to accommodate a pair of vertical backing up plungers 210 whose lower ends are narrowed to a width that will enter the slots 208. The holes 209 are enlarged at their upper ends to accommodate flanges 211 fixed on the plungers. A pair of compression springs 212 react between the flanges 211 and a top closing plate 213 on the block to resist movement of the plungers 210 in an upward direction.

A pair of vertical guide bars 214 fixed in the block 201 extends downwardly through the die plate, and through the underlying plate 203 which here is provided with a relatively large recess 215 (Fig. 37). The bars 214 also extend downwardly through a pair of enlarged holes 216 in a floating punch guide member 217 having an upper portion 218 reduced in width to fit into the overlying recess 215. Finally, the bars 214 pass through a punch supporting member 219 equipped with bushings 220 encircling the bars to facilitate vertical sliding movement of the punch supporting member with respect to the bars. A pair of compression springs 221 located in the recesses 216 and encircling the guide bars 214 react between the underside of the die plate 200 and the top of the punch supporting member 219. These springs are substantially stronger than the springs 212 located at the top of the backing up plungers 210. The punch supporting member at opposed sides thereof in a plane at right angles to the plane of the guide bars 214 is formed to accommodate a pair of headed studs 222 which pass vertically up through the member and are threaded at their upper ends into the floating punch guide member 217 (Fig. 35). The headed studs are sleeved by compression springs 223 which react between the under side of the floating punch guide member and shoulders presented at the bottom of enlarged upper portions of the holes in the punch supporting member 219 through which the studs extend.

The punch supporting member vertically supports a pair of punches 224, cylindrical in their lower portions where they are guided in cylindrical holes 225 formed in the punch guide member 217 and narrowed in their upper portions in a direction longitudinal of the reel stock feed to present a pair of punch blades 226, the width of the tab to be formed. The punch blades, at their opposed outer ends, are formed with vertical fingers 227 which, as the punches are raised, and preparatory to the slitting operation, cooperate with the overlying notches in the reel strip R' properly to locate the strip so that the tab sections will be properly slit. The block 201 and the die 200 are formed with recesses 228 to provide clearance for the fingers in their upward movement. The upper edges of the punches also include portions 229 which slope downwardly toward the center line of the strip so that when the punches are raised to effect the slitting operation, slitting is accomplished gradually from the base of the pre-notched portion inwardly toward the center line of the stock. The normal position of the punches is below the stock where it will not interfere with the feed thereof.

In manner later described, the punch supporting member 219 is raised against the reaction of its springs 221 to effect the slitting operation. This member and the floating punch guide member 217 initially move up as a unit, the fingers 227 on the punches entering the notches in the strip properly to locate the strip in position. After location of the strip, continued upward movement of the floating punch guide member 217, causes the reduced upper portion 218 thereon to engage and clamp the strip in position against the underside of the die as the yielding of the springs 223 permits the punch supporting member to continue its upward movement to slit the tabs (Figs. 38, 40). The tabs are backed up during the slitting operation by the backing up plungers 210 whose associated springs 212 yield as the plungers are raised.

After the slitting operation has been accomplished, the punches 224 back off, permitting the backing up plungers 210 to restore the tabs back into the plane of the strip (Fig. 39). While this is being done, the floating punch guide member 218 continues its clamping action on the strip, and is not withdrawn therefrom until the normal degree of separation between the floating punch guide member and the punch supporting member, as determined by the studs 222 has been accomplished.

At the time the tab slitting operation occurs, a previously slitted section of stock which has advanced to a position beneath the winding head and beyond the left end of the die, is cut off and its tabs bent up to engage between the plates of the head. For this purpose, the die plate is equipped at its left end with a knife edge 230 which cuts off such section of reel stock as a member 231 mounted on the punch support directly beneath presses up against it (Figs. 26, 28, 34, 35). This operation is performed simultaneously with the tab slitting operation. The member 231 is equipped at its opposite ends with vertical tucker blades 232 whose top surfaces 233 slope downwardly in opposite directions toward the transverse center line of the reel and which press up the previously slitted tabs r and tuck them between the two parallel plates 132, 133 in the winding head which, as will be recalled, are spaced apart at their ends for this purpose. The return movement downwardly of the punch supporting member restores the tucker blades to their normal positions clear of the winding head.

During the cutting operation a small vertically disposed spring pressed plunger 234 mounted on the punch support 219 urges the reel stock up against the underside of the die plate in the vicinity of its cutting edge to insure that a clean cut is made. Also during the cutting off operation, the winding head serves to back up the reel. For this purpose, the quill 139 in which the winding head is held against relative up and down movement, is provided with a spring 235 which encircles the body portion thereof and which reacts between the member 142 in which the quill is mounted and an underlying external shoulder 236 presented by the quill (Fig. 17a). In the reel receiving position of the winding head, the member 142 is held down by the bell crank lever 147 but the spring 235 supplies the yield necessary to permit the reel cut-off operation.

The operation of the various mechanisms that have been described, namely the reel stock feed, the slitting of the tabs and the cutting off of the reel and its insertion in the winding head, is accomplished at the appropriate time in the machine cycle, by the engagement of the inner end of a horizontal bar 237 guided in the winding frame for radial movement with the high portion of an edge cam 238 mounted on the center shroud 19 and which thereby moves it outwardly (Figs. 3, 16, and 17). This rod is equipped at its outer end with an enlarged cylindrical head 239 slidable in a boss 240 formed in the winding frame and whose outer face is a truncated cone 241 with base facing inwardly. During the first phase of the bar's movement, the sloping face of the cone engages a downwardly extending arm of a bell crank lever 242 fulcrumed on a fore and aft pivot on the winding frame, and causes a laterally extending arm of the bell crank lever to lift an overlying rod 243 which is guided for vertical movement in brackets 244 supported by the winding frame and whose upper end is connected to a crank arm 245 fixed to an overriding clutch 246 on the sprocket roller shaft 205 (Figs. 16, 41). As the vertical rod 243 is raised, the overriding clutch 246 turns the sprocket roller 204 to advance the reel stock through a distance of one notch and locate the end portion of the stock corresponding to one reel beneath the winding head. The upward movement of the rod 243 is against the load of a compression spring reacting between the bracket 244 and a collar fixed on the rod. As the truncated plunger 241 continues its outward movement, its front face engages the inner pivoted-together ends of two corresponding pairs of links constituting a toggle mechanism 247 whose lower ends swing on pivots fixed in a block 248 secured to a horizontal platform on the winding frame and whose upper ends swing on pivots fixed in a collar 249 secured to a ram 250 guided for vertical movement near its top and bottom in a bracket 251 fixed to the winding frame and in base block 252 respectively.

As the toggle 247 is actuated, the ram 250, which has an enlarged head portion 253, engages the bottom of the punch support 219 and moves it upwardly against the action of the compression springs 221 for the purpose and with the results heretofore described.

The inward movement of the rod 237 which occurs as it rides off the high portion of its cam 238 permits restoration of the plunger 239 to its normal position and consequently the restoration of all of the parts that were operated thereby.

Incidentally, the outer cylindrical portion of the truncated plunger 239 is splined to the inner hollowed out portion of the boss 240 to prevent turning. Its innermost position is determined by a collar 254 fixed on the rod 237 and which banks against the outer face of the frame member. Its outer movement is against the reaction of a pair of tension springs 255 which are anchored at one end to the plunger head and at their other ends to the frame and it is these springs which restore the truncated plunger to its normal position.

When the leading end of the suture has been located adjacent the winding head beneath the tilted surfaces of the clamps 135 thereon and a reel has been inserted in the slot 134 of the winding head, the horizontal actuating rods 144 and 165 associated respectively with the winding head and with the block 155 supporting the upper feed roller 152 and the drag roll 191 ride off the high portions of their respective cams, permitting the winding head and the block to be restored upwardly to their normal positions under the action of their associated springs 143 and 169. As this takes place the nose portions 136 on the clamps 135 associated with the winding head recede from the plate 195 with which they were engaged, permitting the clamps to spring inwardly to clamp the suture between their vertical edge portions and the adjacent face of the plate 132. At this time too, the drag roll 191 moves relatively downwardly into engagement with the suture to institute the required drag, as its associated supporting slides 192 recede from the underlying surface on which they rested during the suture infeed operation. The spindle 131 is arranged for rotation by an overlying coaxial drive shaft 256 journaled for rotation in bearings supported by fixed members of the winding frame unit. The spindle is splined into the shaft so that while it is constrained to rotate with the shaft, it is movable longitudinally with respect to it in order that it may be adjusted to the various levels to which reference has been made (Fig. 17).

While the winding head was in its lowermost position, it was locked against rotation with the plates 132, 133 thereof in a fore and aft direction by a radially disposed pin 257 engaging in a notch 258 presented in the edge of a collar 259 fixed on the shaft. The pin 257 is slidably disposed in a fixed part of the machine. A radially disposed push rod 260 telescopes into the end of the pin, a spring 261 being located between the parts to provide a yielding connection. The outward movement of the rod 260 at the appropriate time will cause positive engagement of the pin with the notch and a spring 262 which reacts on the rod 260 will cause its retraction. However, in order to cause positive retraction, there is provided at a level lower down, a push rod 263 whose outward movement will effect such positive operation, through the medium of a vertical shaft 264 rotatably mounted in bearings fixed on the frame and having rack and pinion connections with the respective rods. As in the case of the rod 260, the rod 263 is slidably disposed in the frame and its outward movement is against the reaction of a spring 265. The rods 260 and 263 are arranged for operation respectively by cams 266 and 267 on the central shroud 69.

As soon as the spindle 131 has been raised to its topmost level, after receiving a reel and being threaded with a suture, a high portion on cam 267, as the turret rotates, pushes the rod 263 outwardly positively to withdraw the pin 257 from the notch 258 and free the shaft 256 for rotation.

Figure 50:
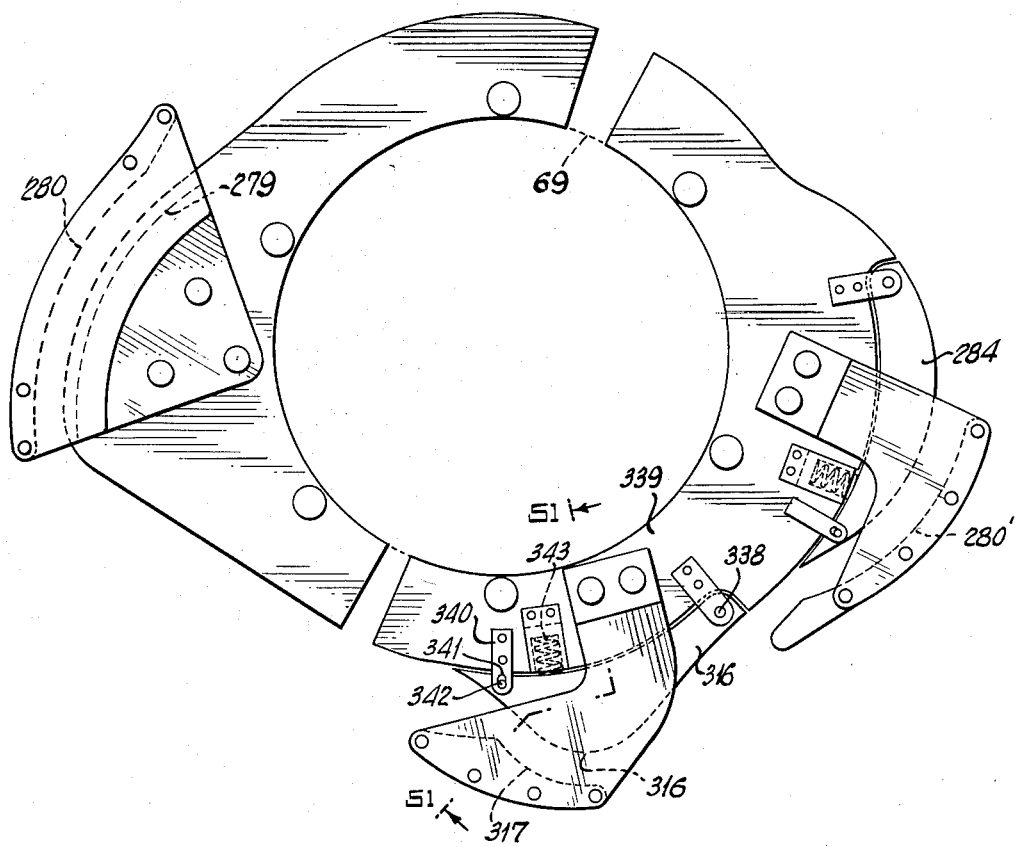
Fig. 50 is a top plan of the cam for accelerating, decelerating and orienting the spindle of the winding head.
Figure 51:
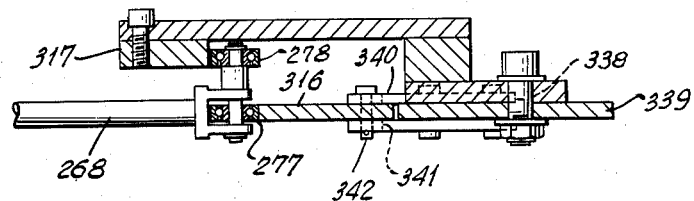
Fig. 51 is a vertical section on line 51—51 of Fig. 50.

Shaft 256 is accelerated gradually up to the full winding speed in order to prevent undue strain on or unthreading of the suture which could result if rapid winding were commenced abruptly. For this purpose, a horizontal fore and aft rod 268, guided for endwise movement in supports located near the top of the winding frame, is provided at its front end with a rack 269 meshing with a pinion 270 fixed at the top of a small vertical shaft 271 which, at its bottom end carries a larger gear 272 driving an overrunning clutch 273 on the shaft 256 (Figs. 16, 17, 41). The rod 268 is normally located in its rearmost position where it is held by the reaction of a compression spring 274 between a collar 275 on the rod and an abutment 276 presented by the rear end of a block which in part guides the rod in its fore and aft movement. The rod 268, at its rear end, is provided with two anti-friction cam followers 277 and 278, one to cooperate with an outside cam 279 and the other with an inside cam 280 (Figs. 50, 51).

As the cam follower 277 rides up on the cam 279, the rod 268 is moved outwardly at a gradually accelerated rate until the winding shaft 256, through the connections previously described, reaches its normal winding speed whereupon a pinion 281 located at the topmost end of the winding shaft meets the leading end of a ring gear 282 presented on the outer peripheral edge of the ring 186 which is fastened to the underside of the machine top plate 53 (Figs. 1, 3). As the turret continues its rotation, the pinion 281 is rotated by its cooperation with the gear 282 to cause the suture to be wound up on the reel.

The parts that inaugurated acceleration of the shaft are in the meantime restored to their normal positions, the rod 269 by its spring 274 and the positive outside return cam 280, and the pinion 270 by the rod 269 assisted by a tension spring 283 connected at one end to the pinion and anchored at its other in a fixed part of the winding frame (Fig. 42).

As the spindle 131 rotates, the suture is wound in loops that pass above the flat horizontal extensions of the reel and below the sloping portions of the winding head so to be below the raised up tabs r. The loops also pass outside of the two pins 137 depending from the lower end of the spindle so that actually the tension exerted on the suture during the winding process is taken up by machine parts rather than by the reel itself.

As the winding operation nears completion, the spindle rotation is gradually decelerated so that it may be brought to rest without shock in the reel discharge position.

To effect deceleration of the winding shaft, the follower 277 on the horizontal rod 268 is caused to ride up on a cam 284 whose initial rise is rapid to bring the overriding clutch on the winding shaft up to winding speed. Thereupon the pinion 281 at the top of the shaft comes to the terminus of the ring gear 281 whereupon the cam rise is more and more gradual until, when it reaches its peak, the shaft has come to rest. The rod 268 is returned to normal position the same as before and with the assistance of an outside cam 280 cooperating with the follower 278.

During the period of spindle deceleration, the cutting device associated with the guide 80 is caused to operate to cut off the tail end of the suture, so that all sutures wound up by the machine will be of the same length.

During the period of deceleration, the end of the rod 76 associated with the platform 70 on which the guide and the cutting mechanism is mounted arrives opposite a high portion on its associated cam 79 causing the platform to be moved to its outermost position. The cam 79 then tapers off to a low point at a rate that will permit the cutting mechanism to move inwardly at a speed slightly greater than the speed at which the strand will be winding up at the instant of cutting. Consequently, when the cutting operation takes place, the momentary action of the knife passing through the suture to effect cutting will have no effect upon the rate at which the suture is being pulled in by the rotation of the winding spindle.

Referring back to Figs. 22, 23, 24, 25, it will be recalled that the transverse pin 107 in its downward movement to release the plate 101 which forms the guiding aperture, stopped short of a position which would permit release of the plate 110 presenting the cutting knife 111. However, as the platform 70 is being moved inwardly to effect the cutting operation, the anti-friction roller 126 on the lever 123 which controls the operation of the pin 107 engages an underlying cam 286 on the outside machine frame, and whose rise is sufficient to depress the pin 107 below the abutment 112 on the knife disc. The knife disc thereupon rotates under the action of its associated coil spring 113 to force the knife blade 111 past the anvil to sever the suture. Subsequently, during the rotation of the turret, a cam 287 likewise located on the outside machine frame, engages the pin 128 which passes through the knife blade plate 110 and which is fixed in the guide plate 101, and restores both of the plates to their normal positions by rotating them through a distance sufficient to permit the transverse pin 107 to engage in front of the abutments 108 and 112 on the guide plate and the cut-off plate respectively, whereupon the pin 107 moves up to its normal position in front of the abutments by the action of the spring 121 on the vertical post with which it is associated.

After cut off of the suture, and sufficient further rotation of the spindle to wind up all of it on the reel, the spindle is arrested in the reel discharge position which is at 90° to the initial fore and aft position in which the suture is threaded into the machine. To effect this positioning of the spindle, the rear end of the horizontal rod 260 associated with the pin 257, engages a high portion of its associated cam and moves outwardly causing the pin to press against the edge of the collar 259 so that when a notch 288 in the collar, spaced at 90° from the notch 258 and which determines the reel ejection position of the spindle, arrives opposite the pin, the pin will spring into the notch and bring the spindle to rest.

With the parts thus positioned, the spindle is moved downwardly to an intermediate position between the top winding position and that where the head receives the reel. This is brought about through the outward movement of the rod 144 caused by a high portion at the appropriate place on its corresponding cam 145 and through the rotation by the rod of the bell crank lever 147 which acts upon the collar 142 encircling the quill 131 (Fig. 17b). At the same time that the winding head moves down to the reel ejecting position, a pair of tab ejecting blades 289 and 290 mounted at the opposed end of a semicircular yoke 291 partially encircling the spindle and which stand clear of the winding head in their normal positions, are moved downwardly through the slots 134 between the plates 132, 133 of the winding head and into overlying engagement with the tabs held in the slots.

The yoke 291 is arranged for sliding movement in a vertical direction and for this purpose is fixed at the lower ends of a series of three vertical rods 292 slidably arranged in a fixed part in the machine and which at their upper ends are joined together by a substantially similar yoke 293 which partially encircles the quill 139. This ejector blade ensemble is normally held up against the underside of the collar 142 which is around the quill, by a series of vertical compression springs 294 reacting between the top yoke 293 and an underlying fixed portion of the machine. The springs are held in place by locating pins 295 which clear through underlying holes 296 in the fixed frame when the yoke is depressed. The upper yoke 293 is equipped with laterally extending pins 297 underlying forwardly extending arms of a bell crank lever 298 fulcrumed in a fixed part of the machine and which has an upwardly extending arm disposed in front of a fore and aft rod 299 guided for sliding movement in fixed parts of the machine frame and whose rear end is arranged to engage an appropriately shaped cam 300 fixed on the center shroud 69.

As previously stated, the blades move down with the winding head which locates the reel in a transverse groove 301 whose bottom is level with the top of the die plate and which is formed in a block 302 at the left end thereof (Figs. 43, 44). The winding head, again under the control of its associated shroud cam moves back upwardly to its normal position but the blades remain depressed under the control of their associated shroud cam so that the reel is discharged from the winding head. The reel, in its released position, is located endwise in front of an ejecting rod 303 horizontally disposed for lateral movement with respect to the winding frame in a guideway passing transversely through the block 201 which overlies the die and just above the die itself. The rod 303 moves to the left to push the reel into discharge tunnel 304 formed by a plate 305 which closes the recess 301 at the top. As the ejector rod 303 moves to the left, the blade yoke moves upwardly to take the right-hand blade out of its path. The left-hand blade, however, is biased for sliding movement downwardly for a limited distance on the yoke and accordingly stays in contact with the reel until it has entered the tunnel. Thereupon it moves upwardly to clear the bar 303 whose movement toward the left is sufficient to push the reel all the way into the bottom of a glass tube T at the outlet of the tunnel 304. In order to provide its endwise movement, the rod 303 is formed in its rear side with rack teeth 306 meshing with a pinion 307 arranged for rotation by a vertical shaft 308 journaled for rotation in the block 201 (Figs. 34, 35, 41, 41a). The shaft 308 through a train including three vertical rotatable shafts 309, 310, and 311 with interconnected gearing is connected through an idler gear 312 with a rack 313 on a horizontal fore and aft shaft 314 whose rear end is designed to cooperate with a cam 315 fixed on the shroud 69. According to this arrangement, as soon as the reel with suture wound thereon has been ejected from the winding head, the horizontal rod 314 meets with a high portion on its associated cam, causing the rod to be pushed outwardly and thereby to rotate the pinion 307 through the chain of connections previously described to move the end of the discharge bar 303 against the end of the reel as previously described. After the reel has been discharged into the tube T, the discharge bar is returned to its normal position by the rearward movement of the horizontal bar 314 which actuated it. This rearward movement of the bar 314 is a positive one brought about by a pair of anti-friction rollers on the end of the bar 314 for cooperation with inner and outer edge cams.

After the reel ejector blades 289, 290 have been restored upwardly to their normal positions, and stand clear of the winding head, the latter is again given a partial rotation to restore it to its initial fore and aft position ready to receive a new suture and a new reel. This is accomplished first by the withdrawal of the pin 257 out of the notch 288 in the collar 259 which determines the ejection position of the winding head. This withdrawal is a positive one and brought about, as previously described, by the outward movement of the rod 263 in cooperation with its associated cam and through the medium of the intermediate shaft 264 and pinion linkage which connects it with the rod 260 on which the pin is mounted. As soon as the pin 257 stands clear of the notch 288 in the collar 259, the fore and aft rod 268 near the top of the frame is moved outwardly by coaction with a cam 316 to rotate the shaft 256 in the manner hereinbefore described. As soon as rotation of the shaft 256 commences, the positioning pin 257 again moves outwardly by cam action on the rod 260 which supports it, again to engage itself with the peripheral edge of the collar 259 so that when the notch 258 therein that defines the normal or fore and aft position of the winding head again arrives opposite the pin, the latter snaps into the notch and thus positions the spindle and consequently the winding head ready to receive another strand in the next cycle of operation of the machine. Here again the return movement of the rod 268 is positive, and is occasioned by the action of an inside cam 317 cooperating with the cam follower 278 (Figs. 50, 51).

The tubes T into which the wound reels are discharged are presented one after another in longitudinal alignment with the outlet end of the discharge tunnel 304 and are removed from in front of the discharge tunnel one after another as they are filled. Mechanism for this purpose includes a hopper 318 (Fig. 17) vertically mounted on the side of the winding frame and in which the tubes are deposited automatically in horizontal position one above another. At the base of the hopper and in a bracket 329 secured to the side of the winding frame, there are journaled two horizontal shafts 319, 320 arranged one behind the other in parallel relation and each having fixed thereto, in corresponding spaced relation, a pair of star wheels 321, 322, whose surfaces are designed to grasp and hold a tube in alignment with the discharge tunnel 304 when the star wheels are stationary, and to discharge a filled tube below and bring an overlying tube into alignment with the discharge tunnel when the star wheels are rotated. The star wheels are rotated in opposite directions to discharge a filled tube and to receive an empty tube once during each cycle of operation of the winding head with which it is associated. For this purpose there is a horizontal push rod 323 guided for movement in a fore and aft direction in parts fixed to the winding frame. The rod 323 is held normally in its rearmost position as determined by a collar 324 on the rod banking against a fixed part of the frame, by a compression spring 325 reacting between the front face of the collar and the rear face of a fixed part in which the rod is guided. The rod 323 is arranged at its rear end to track along an edge cam (not shown) fixed on the center shroud and after a tube in receiving position has been loaded with a wound reel discharged in the manner hereinbefore described and after the discharge bar has been withdrawn out of the tube back to its normal position, the rod engages a high portion of its associated cam to displace the rod forwardly. At its forward end, the rod 323 is provided with a pivotally mounted dog 326 which engages the teeth of a ratchet wheel 327 fixed on a shaft 328, parallel with the star wheel supporting shafts, and journaled for rotation in the supporting bracket 329. On the shaft carrying the ratchet wheel, there is fixed a pinion 330 meshing with a corresponding pinion 331 fixed on the shaft of the adjacent star wheel. Near the outer end of this star wheel shaft there is fixed another pinion 332 meshing with a corresponding pinion 333 on the other star wheel shaft. The arrangement is such that each time the rod 323 is moved outwardly, the dog 326 engages the ratchet wheel to effect rotation of both star wheel shafts in amount sufficient to displace the filled tube and bring an empty tube into alignment with the discharge tunnel as previously described. Each time the star wheels operate, a spring pressed detent 334 supported in the bracket 329 adjacent the outer face of one of the intermeshing gears with which the star wheel shafts are equipped enters the next in order of a series of depressions 335, provided one for each position of the star wheel, accurately to determine such position. Upon return of the push rod 323 to normal position, which is effected by its associated spring 325 and as its rear end rides off the high portion of the cam which effected its forward movement, the dog 326 tilts against the tension of a spring 336 and merely rides over the teeth of the ratchet wheel without effect. Each time a filled tube is moved out of filling position, it is deposited by the star wheels into an underlying hopper 337 which leads toward the front of the winding frame for later automatic discharge and further processing.

It will be recalled that deceleration of the winding shaft and its orientation from the reel discharge position back to the fore and aft receiving position is effected by the outward movement of the rod 268 by coaction with the cams 284 and 316 on the shroud 69 (Figs. 50, 51). Since there is a possibility that the stop pin 257 might snap into one or another of the notches in the collar 259 before the rod 268 completes its outward travel, breakage could occur were safety measures not taken to prevent it. To this end, the cam lobes such as the lobe 316 which determines the outward travel of the rod 268, during the corresponding phase of the cycle, is arranged on a pivot 338 fixed on the body portion 339 of the cam, for slight movement edgewise of the cam as determined by a strap 340 likewise fixed on the body portion 339 of the cam. The strap is formed with a slot 341 to accommodate a pin 342 extending through the cam lobe and having a fixed position with respect thereto. A compression spring 343 recessed in the edge of the body portion of the cam presses against the inner adjacent edge of the pivoted lobe.

According to this arrangement, should interference be presented to the outward movement of the rod 268, the lobe 316 will merely yield against the reaction of the spring 343 permitting the cam follower on the rod to traverse the peak of the lobe without damage to any of the parts.

It should be understood that each winding frame 11 and the mechanism carried thereby are duplicated in the other winding frames carried by the turret but that the control mechanism carried by the fixed parts of the machine such as the cams on the center shroud and on the top and outside frame members, and the hopper from which the sutures are picked up one at a time by the winding heads as they pass by, are common to all the winding heads. During operation of the machine, rotation of the turret is continuous, attention only being required by the operator to insure maintenance of a supply of sutures in the hopper. With this brief statement and in view of the descriptions heretofore given it is believed that the entire operation of the machine will be apparent to those skilled in the art.

It should be understood that the invention has been described in connection with one embodiment only thereof, and that many modifications are included within its spirit. The invention, therefore, is to be limited only by the scope of the appended claims.

The claims are:

1. In a machine for winding flexible strands on a reel, the combination of a winding head adapted to hold a reel on which a strand is to be wound, means for clamping a strand and feeding it endwise toward the winding head and intermediate devices operable to take over and continue the endwise infeeding of the strand toward the winding head upon release of the clamping means.

2. A machine according to claim 1 wherein the intermediate devices include a pair of feed rolls at least one of which is driven.

3. In a machine for winding flexible strands on a reel, the combination of a winding head adapted to hold a reel on which a strand is to be wound and which is movable from a winding position to a strand receiving position, means for clamping a strand and feeding it endwise toward the winding head, intermediate devices adapted when operative to take over and continue the endwise infeeding of the strand toward the winding head upon release of the clamping means, and mechanism for rendering said devices operative upon movement of the winding head to strand receiving position and inoperative upon movement of the head to winding position.

4. A machine according to claim 3 wherein the intermediate devices include a pair of feed rolls at least one of which is positively driven during the period such devices are operative.

5. A machine according to claim 3, wherein the intermediate devices also include mechanism for controlling tension in the strand during its wind-up by the winding head.

6. A machine according to claim 5, wherein the mechanism for controlling tension on the strand is inoperative when the intermediate infeed devices are operative and operative when said infeed devices are inoperative.

7. A machine according to claim 5, wherein the mechanism for controlling tension in the strand is inoperative when the winding head is in the strand receiving position and operative when the winding head is in strand winding position.

8. In a machne for winding flexible strands, the combination of a spindle rotatable to wind a strand thereon, means operable to arrest the spindle in a predetermined angular position with respect to the axis about which it rotates to receive the strand for winding and for arresting the spindle after winding in a predetermined angular position with respect to said axis for discharge, and means having a common control for arresting the spindle in both of said predetermined positions.

9. A machine according to claim 8 wherein the means for arresting the spindle includes means on the spindle corresponding to each of the predetermined positions and common mechanism timed to cooperate with both said means.

10. A machine according to claim 9 wherein the means for arresting the spindle includes a collar thereon formed with a notch corresponding to each of said positions and wherein the mechanism cooperating therewith includes a pin movable into either of said notches according to whether the spindle is to receive a strand for winding or to discharge a wound strand.

11. A machine according to claim 10 wherein both the entry and withdrawal movements of the pin into and out of the notches in the collar are positively effected.

12. In a machine for winding strands upon a reel, the combination comprising a rotatable device and means carried by said device for gripping a reel and means mounted on the reel gripping means for holding a strand at its end in relative position with respect to the reel such that rotation of the device automatically cause the strand to be coiled about the reel.

13. In a machine for winding a strand on a reel, the combination of a spindle having means for holding a reel and means on the reel holding means for holding the end of a strand, both said means being so disposed with respect to each other on the spindle that rotation of the spindle automatically loops the strand about the reel.

14. In a machine for winding a strand on a reel, the combination of a spindle and, mounted thereon, a device for holding a reel and on said device a pair of clamps for gripping the end of a strand, said spindle holding the reel in such manner that rotation of the spindle causes the strand to be looped around the reel.

15. In a machine for winding a strand on a reel having a plurality of spaced tabs projecting upwardly from one side of the reel, the combination of a winding head with flat sides presenting a plurality of clamps for holding the ends of a strand and with vertical slots in the ends thereof for receiving and holding the tabs, said ends being cut away beneath the position of the tabs when held in said slots whereby the strand is wound on the reel beneath said tabs upon rotation of the winding head, and means for rotating the head.

16. A combination according to claim 15, wherein the clamps presented at the side face of the head are pivotally mounted thereon and movable to an inactive position to permit positioning of a strand against the side face and to an active position to hold the strand against said face when so positioned.

17. In a machine for winding a strand on a reel, the combination of a winding head, a plurality of reels in strip form, means for feeding the strip to locate a portion thereof corresponding to one reel in a position adjacent the winding head, and means operable to cut off such portion of the reel and insert it in the winding head.

18. In a machine for winding a strand on a reel, the combination of a winding head equipped with tab receiving slots, a plurality of reels in strip form, means for punching tabs in the strip at one position, means for cutting off a portion of the strip with tabs punched therein and inserting the tabs in the slot in the winding head at another position, and common devices for actuating the tab punching means and the reel cut off device.

19. A combination according to claim 18 wherein the reel cut off means and tab inserting means are jointly actuated.

20. In a machine for winding a strand on a reel, the combination of a winding head, a plurality of reels in strip form, means for feeding the strip through a distance of one reel at a time to locate a leading end portion of the strip corresponding to the width of one reel adjacent the winding head, means for cutting off such end portion of the strip and inserting the reel thus cut off into the winding head, and common means for actuating the strip feed device and the reel cut off device.

21. A combination according to claim 20 wherein the common actuating means also operates devices for preforming tabs in each reel portion of the strip prior to the arrival of such portions in the reel cut off position, and wherein the winding head is equipped with slots to receive and hold such tabs.

22. In a machine for winding a strand on a reel, the combination of a winding head arranged to accommodate a reel and rotatable to wind a strand upon the reel, a strand cutting device located adjacent the strand during the winding process, means operable during the winding of the strand to impart motion to the strand cutting device in the direction and at the rate of strand feed, and means for operating the cutting device to cut the strand during the period of such motion.

23. A combination according to claim 22 wherein the speed of movement imparted to the cutting device is such as not to interfere with the wind up travel of the strand.

24. A combination according to claim 22 wherein means are provided for operating the cutting device at a predetermined phase of the machine cycle.

25. A machine for winding a strand on a reel equipped with tabs, the combination of a winding head formed with slots to receive said tabs and locatable in one position to receive a reel and the end of a strand and in a different position to doff a wound reel from the head, means on the head for holding the reel and the strand in relative positions such that rotation of the head causes winding of the strand on the reel, and means arranged for relative movement with respect to the head and when the head is in doffing position, for doffing a wound reel from the head, said doffing means being equipped with a plurality of blades in alignment with the slots in the head when the head is in reel discharge position and adapted, upon relative movement of the blades and the head, to doff the reel from the head.

References Cited in the file of this patent

UNITED STATES PATENTS

| | | |
|---|---|---|
| 1,131,953 | Pilkington | Mar. 16, 1915 |
| 1,771,869 | Baldenhofer | July 29, 1930 |
| 1,780,856 | Adam | Nov. 4, 1930 |
| 1,815,134 | Weiner | July 21, 1931 |
| 1,886,122 | Rose | Nov. 1, 1932 |
| 1,934,999 | Triou | Nov. 14, 1933 |
| 1,993,970 | MacMurray | Mar. 12, 1935 |
| 2,163,578 | Baker | June 27, 1939 |
| 2,279,323 | Johnson | Apr. 14, 1942 |
| 2,311,736 | Cleminson | Feb. 23, 1943 |
| 2,331,004 | Standish | Oct. 5, 1943 |
| 2,405,215 | Jacobson | Aug. 6, 1946 |
| 2,415,543 | Wagner | Feb. 11, 1947 |
| 2,417,574 | Themak | Mar. 18, 1947 |
| 2,445,998 | Drake | July 27, 1948 |
| 2,554,855 | Creed | May 29, 1951 |
| 2,598,485 | Adams | May 27, 1952 |

FOREIGN PATENTS

| | | |
|---|---|---|
| 5,498 | Great Britain | Mar. 8, 1909 |
| 529,958 | Great Britain | Dec. 2, 1940 |